US009584726B2

(12) United States Patent
Kunishige et al.

(10) Patent No.: US 9,584,726 B2
(45) Date of Patent: Feb. 28, 2017

(54) IMAGING APPARATUS, IMAGING METHOD, AND COMPUTER-READABLE RECORDING MEDIUM

(71) Applicant: OLYMPUS CORPORATION, Hachioji-shi, Tokyo (JP)

(72) Inventors: Keiji Kunishige, Tokyo (JP); Ryuta Takeya, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 14/710,261

(22) Filed: May 12, 2015

(65) Prior Publication Data

US 2015/0244937 A1    Aug. 27, 2015

Related U.S. Application Data

(63) Continuation of application No. PCT/JP2014/064744, filed on Jun. 3, 2014.

(30) Foreign Application Priority Data

Sep. 9, 2013  (JP) ................................ 2013-186780

(51) Int. Cl.
*H04N 5/232* (2006.01)
*G03B 17/02* (2006.01)
(Continued)

(52) U.S. Cl.
CPC .......... *H04N 5/23245* (2013.01); *G03B 17/02* (2013.01); *H04N 5/2226* (2013.01);
(Continued)

(58) Field of Classification Search
CPC  H04N 5/23245; H04N 5/232; H04N 5/23212; H04N 5/2226; H04N 5/235; H04N 5/23216; H04N 5/772; H04N 1/2112; G03B 17/02

See application file for complete search history.

(56) References Cited

U.S. PATENT DOCUMENTS 7,505,679 B2 *  3/2009  Hisamatsu ......... H04N 5/23245
                                              396/137
7,598,997 B2 * 10/2009  Shiraishi ............ H04N 5/23212
                                              348/353

(Continued)

FOREIGN PATENT DOCUMENTS

JP    2004-157353 A    6/2004
JP    2007-041119 A    2/2007

(Continued)

OTHER PUBLICATIONS

International Search Report mailed in counterpart International Patent Application No. PCT/JP2014/064744 on Sep. 16, 2014, consisting of 4 pp.

(Continued)

*Primary Examiner* — Luong T Nguyen
(74) *Attorney, Agent, or Firm* — Volpe and Koenig, P.C.

(57) ABSTRACT

An imaging apparatus having multiple shooting functions includes: an imaging unit that images a subject; two operating units each receives an input of a change signal for instructing a change in shooting parameter of a preset shooting function; a release switch that receives an input of a shooting preparation signal for instructing a shooting preparation operation when pressed halfway; a setting unit that sets at least one or more shooting functions among the multiple shooting functions, to the two operating units; and a control unit that switches over the at least one or more shooting functions of the two operating units, to a limited shooting function capable of conforming to a change in a shooting condition of the subject, when the release switch is being kept pressed halfway even after the release switch is (Continued)

pressed halfway to fix a focal position and/or photometric value with respect to the subject.

6 Claims, 19 Drawing Sheets

(51) Int. Cl.
    *H04N 5/222*     (2006.01)
    *H04N 5/235*     (2006.01)

(52) U.S. Cl.
    CPC ............ *H04N 5/232* (2013.01); *H04N 5/235* (2013.01); *H04N 5/23212* (2013.01); *H04N 5/23216* (2013.01)

(56) References Cited

U.S. PATENT DOCUMENTS

| | | |
|---|---|---|
| 7,761,002 B2 | 7/2010 | Akagane |
| 8,264,585 B2 | 9/2012 | Shintani |
| 2010/0134433 A1* | 6/2010 | Miyanishi ............... G03B 19/00 345/173 |

FOREIGN PATENT DOCUMENTS

| | | |
|---|---|---|
| JP | 2009-207134 A | 9/2009 |
| JP | 2012-226214 A | 11/2012 |

OTHER PUBLICATIONS

Office Action mailed in counterpart Japanese Patent Application No. 2013-186780 on Oct. 25, 2016, consisting of 7 pp. (English Translation Provided).

\* cited by examiner

IMAGING APPARATUS, IMAGING METHOD, AND COMPUTER-READABLE RECORDING MEDIUM

CROSS REFERENCES TO RELATED APPLICATIONS

This application is a continuation of PCT international application Ser. No. PCT/JP2014/064744 filed on Jun. 3, 2014 which designates the United States, incorporated herein by reference, and which claims the benefit of priority from Japanese Patent Application No. 2013-186780, filed on Sep. 9, 2013, incorporated herein by reference.

BACKGROUND

1. Technical Field

The disclosure relates to an imaging apparatus, an imaging method, and a computer-readable recording medium, for capturing an image of a subject to generate image data of the subject.

2. Related Art

In recent years, a technique has been known, which allows a shooting function, which is able to change a desired shooting parameter, for example, the aperture value or exposure compensation, to be allocated by a user's manipulation to each of a plurality of operating members provided near a release switch (see Japanese Patent Application Laid-open No. 2012-226214). According to this technique, if a user manipulates any of the plurality of operating members, switch-over to a shooting function that has been allocated to the manipulated operating member is performed, and shooting is done while a shooting parameter is changed.

SUMMARY

In some embodiments, an imaging apparatus having a plurality of shooting functions includes: an imaging unit configured to capture an image of a subject to generate image data of the subject; two operating units each configured to receive an input of a change signal for instructing a change in shooting parameter of a preset shooting function; a release switch configured to be projected and depressed by an external pressing force, configured to receive an input of a shooting preparation signal for instructing a shooting preparation operation when pressed halfway, and configured to receive an input of a shooting signal for instructing shooting when fully pressed; a setting unit configured to set at least one or more shooting functions among the plurality of shooting functions, to each of the two operating units such that different shooting functions are allocated to each of the two operating units; and a control unit configured to switch over the at least one or more shooting functions of each of the two operating units set by the setting unit, to a limited shooting function capable of conforming to a change in a shooting condition of the subject, when the release switch is being kept pressed halfway even after the release switch is pressed halfway to fix at least one of a focal position and photometric value with respect to the subject.

In some embodiments, an imaging method is executed by an imaging apparatus having a plurality of shooting functions. The imaging apparatus includes: an imaging unit configured to capture an image of a subject to generate image data of the subject; two operating units each configured to receive an input of a change signal for instructing a change in shooting parameter of a preset shooting function; and a release switch configured to be projected and depressed by an external pressing force, configured to receive an input of a shooting preparation signal for instructing a shooting preparation operation when pressed halfway, and configured to receive an input of a shooting signal for instructing shooting when fully pressed. The imaging method includes: a setting step of setting at least one or more shooting functions among the plurality of shooting functions, to each of the two operating units such that different shooting functions are allocated to each of the two operating units; and a control step of switching over the at least one or more shooting functions of each of the two operating units set at the setting step, to a limited shooting function capable of conforming to a change in a shooting condition of the subject, when the release switch is being kept pressed halfway even after the release switch is pressed halfway to fix at least one of a focal position and photometric value with respect to the subject.

In some embodiments, a non-transitory computer-readable recording medium with an executable program stored thereon is provided. The program instructs an imaging apparatus that has a plurality of shooting functions and includes: an imaging unit configured to capture an image of a subject to generate image data of the subject; two operating units each configured to receive an input of a change signal for instructing a change in shooting parameter of a preset shooting function; and a release switch configured to be projected and depressed by an external pressing force, configured to receive an input of a shooting preparation signal for instructing a shooting preparation operation when pressed halfway, and configured to receive an input of a shooting signal for instructing shooting when fully pressed, to perform: a setting step of setting at least one or more shooting functions among the plurality of shooting functions, to each of the two operating units such that different shooting functions are allocated to each of the two operating units; and a control step of switching over the at least one or more shooting functions of each of the two operating units set at the setting step, to a limited shooting function capable of conforming to a change in a shooting condition of the subject, when the release switch is being kept pressed halfway even after the release switch is pressed halfway to fix at least one of a focal position and photometric value with respect to the subject.

The above and other features, advantages and technical and industrial significance of this invention will be better understood by reading the following detailed description of presently preferred embodiments of the invention, when considered in connection with the accompanying drawings.

DETAILED DESCRIPTION

Modes for carrying out the present invention (hereinafter, referred to as "embodiments") will be described below with reference to the drawings. The present invention is not to be limited by the following embodiments. The same reference signs are used to designate the same elements throughout the drawings. The drawings are schematic, and it is necessary to note that the relation between the thickness and width of each component and the ratios among the respective components are different from the actual. In addition, a portion is included, which has different sizes and ratios among the drawings.

First Embodiment

Figure 1:
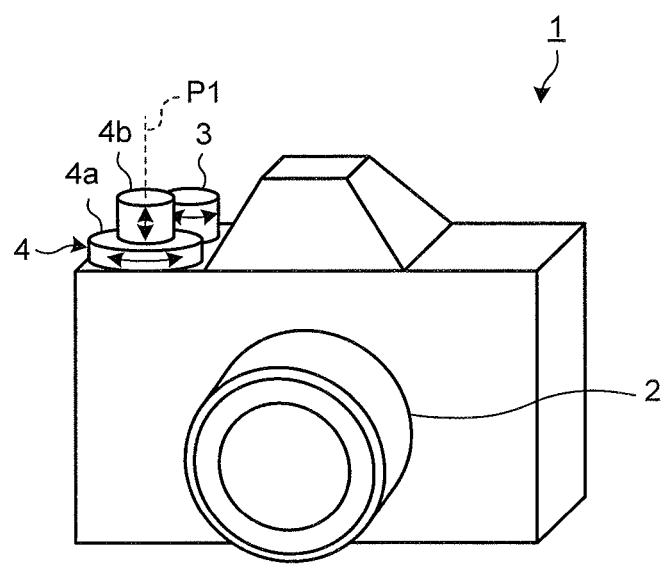
FIG. 1 is a perspective diagram illustrating a configuration of a subject facing side of an imaging apparatus according to a first embodiment of the present invention.
Figure 2:
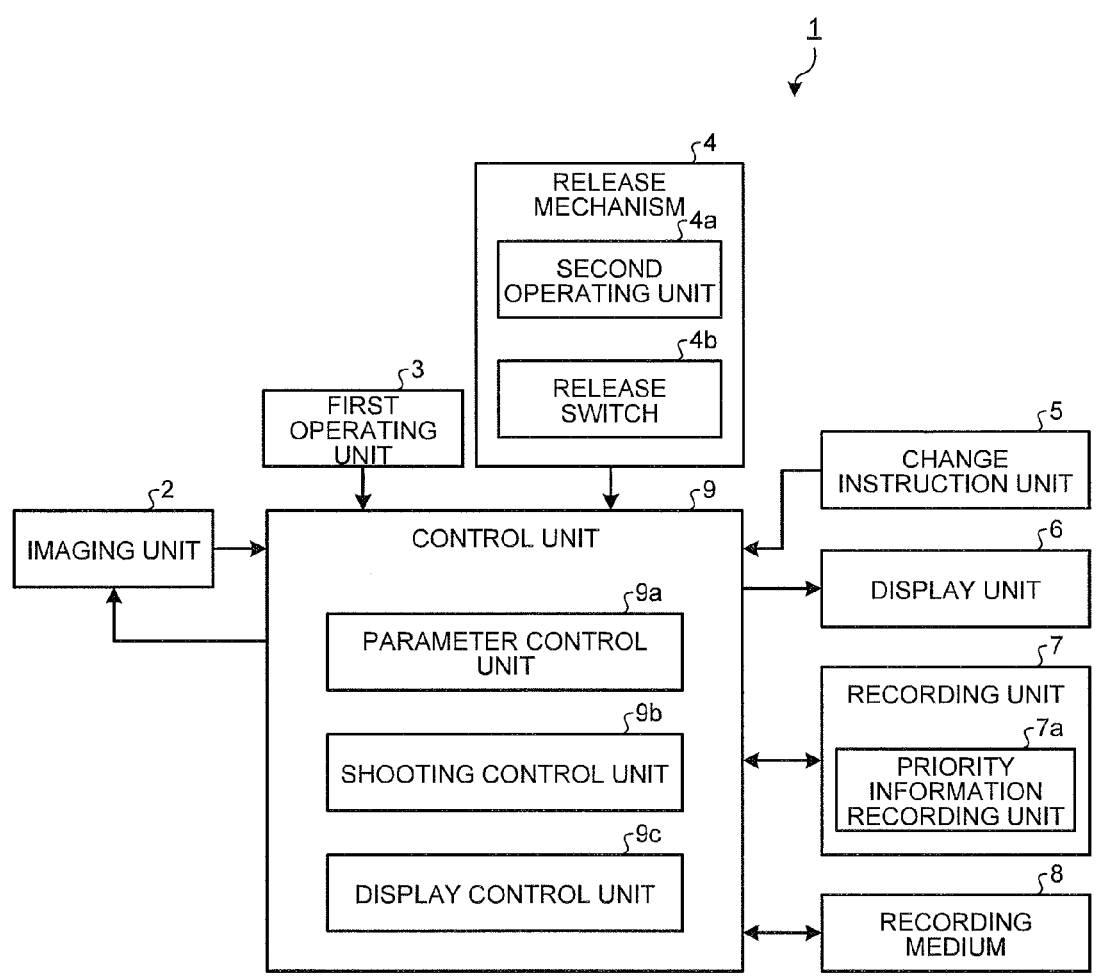
FIG. 2 is a block diagram illustrating a functional configuration of the imaging apparatus according to the first embodiment of the present invention.

FIG. 1 is a perspective diagram illustrating a configuration of a subject facing side (front side) of an imaging apparatus according to a first embodiment of the present invention. FIG. 2 is a block diagram illustrating a functional configuration of the imaging apparatus according to the first embodiment of the present invention.

An imaging apparatus 1 illustrated in FIG. 1 and FIG. 2 includes an imaging unit 2, a first operating unit 3, a release mechanism 4, a change instruction unit 5, a display unit 6, a recording unit 7, a recording medium 8, and a control unit 9.

Under control by the control unit 9, the imaging unit 2 captures an image of a subject and generates an image data. The imaging unit 2 is configured by using: an optical system, which is configured of a plurality of lenses and forms a subject image; an aperture, which adjusts light quantity of the optical system; an imaging element, such as a charge coupled device (CCD) or complementary metal oxide semiconductor (CMOS), which generates the image data by optically receiving and photoelectrically converting the subject image formed by the optical system; a shutter, which sets a state of the imaging element to an exposed state or shaded state; a signal processing unit, which performs predetermined analog processing on the image data generated by the imaging element; and an A/D converter, which generates and outputs to the control unit 9, digital image data, by performing A/D conversion on analog image data input from the signal processing unit.

The first operating unit 3 receives an input of an instruction signal that changes a value of a shooting parameter of a shooting function that has been allocated thereto beforehand. The first operating unit 3 is provided on a photographer side on a top face of the imaging apparatus 1. The first operating unit 3 is rotatably provided around a predetermined axis. The first operating unit 3 is configured by using a dial type rotary member.

The release mechanism 4 has a second operating unit 4a and a release switch 4b. The second operating unit 4a receives an input of an instruction signal that changes a value of a shooting parameter of a shooting function that has been allocated thereto beforehand. The second operating unit 4a is provided on a top face, which is the top face of the imaging apparatus 1 and is on a subject side thereof. The second operating unit 4a is rotatably provided around a predetermined axis P1. The second operating unit 4a is configured by using a dial type rotary member.

The release switch 4b is able to be projected and depressed (able to go up and down) by an external pressing force, and, when pressed halfway, receives an input of a shooting preparation signal (hereinafter referred to as the "1st") that instructs a shooting preparation operation, and when fully pressed, receives an input of a shooting signal (hereinafter, referred to as the "2nd") that instructs shooting. The release switch 4b is provided on the axis P1 of the second operating unit 4a and on the top face of the second operating unit 4a.

The change instruction unit 5 receives an input of an instruction signal that instructs various settings of the imaging apparatus 1. The change instruction unit 5 receives inputs of setting signals that set shooting functions to be respectively allocated to the first operating unit 3 and second operating unit 4a. The change instruction unit 5 is configured by using, for example, a cross key or jog dial, an OK button that receives an input of a signal that determines an operation content, and the like. In this first embodiment, the change instruction unit 5 functions as a setting unit.

Under control by the control unit 9, the display unit 6 displays an image corresponding to the image data generated by the imaging unit 2. The display of the image includes: rec view display of displaying, for a predetermined time period (for example, three seconds), the image data that has just been shot; playback display of playing back the image data recorded in the recording medium 8; live view display of sequentially displaying, along a time series, live view images corresponding to the image data continuously generated by the imaging unit 2; and the like. Further, the display unit 6 displays information related to operation information and shooting of the imaging apparatus 1. The display unit 6 is configured by using a display panel made of a liquid crystal or organic electroluminescence (EL), a driver, and the like.

The recording unit 7 records therein image data input via the control unit 9, information being processed by the imaging apparatus 1, various programs for causing the imaging apparatus 1 to be operated, a program according to this first embodiment, various data used during execution of the programs, and the like. The recording unit 7 is configured by using a synchronous dynamic random access memory (SDRAM), a Flash memory, and the like. Further, the recording unit 7 has a priority information recording unit 7a.

The priority information recording unit 7a records therein a shooting function capable of changing a shooting parameter having a high priority that a user wishes to reflect the most in finishing of picture making of an image corresponding to the image data generated by the imaging unit 2. Specifically, as shooting parameters having high priorities in a finished result of picture making, the priority information recording unit 7a records exposure compensation, shutter speed, aperture value, contrast, and chroma. The user selects a shooting parameter beforehand by the change instruction unit 5 and causes the priority information recording unit 7a to record (register) it therein.

The recording medium 8 records therein image data input via the control unit 9. The recording medium 8 is configured by using a memory card or the like, which is inserted from outside of the imaging apparatus 1, and is detachably inserted in the imaging apparatus 1 via a memory I/F not illustrated. Under control by the control unit 9, image data or moving image data are written into the recording medium 8. The image data or moving image data recorded in the recording medium 8 are read out by the control unit 9.

The control unit 9 comprehensively controls operations of the imaging apparatus 1 by performing transfer or the like of instructions and data corresponding to respective units forming the imaging apparatus 1. The control unit 9 is configured using a central processing unit (CPU) or the like.

Hereinafter, a detailed configuration of the control unit 9 will be described. The control unit 9 has a parameter control unit 9a, a shooting control unit 9b, and a display control unit 9c.

The parameter control unit 9a sets a shooting parameter of the imaging unit 2 according an instruction signal input from the first operating unit 3 or second operating unit 4a. Specifically, the parameter control unit 9a changes ISO sensitivity of the imaging unit 2, when an instruction signal that changes the ISO sensitivity is input from the first operating unit 3. Further, the parameter control unit 9a performs allocation to the first operating unit 3 and second operating unit 4a, based on setting signals for setting shooting functions of the first operating unit 3 and second operating unit 4a respectively from the change instruction unit 5.

Further, the parameter control unit 9a switches over the shooting function allocated to the first operating unit 3, if the 1st is input from the release switch 4b (if pressed halfway). Specifically, the parameter control unit 9a switches over the shooting function allocated to the first operating unit 3 to a shooting function that is able to conform to a change in a shooting condition of a subject, if the 1st is input from the release switch 4b (if pressed halfway). For example, if the 1st is input from the release switch 4b, the parameter control unit 9a refers to priority information recorded in the priority information recording unit 7a and switches over the shooting functions allocated to the first operating unit 3 and second operating unit 4a to shooting functions having shooting parameters of high priorities in a finished result of an image corresponding to image data, for example, to a shooting function that is able to change exposure compensation.

The shooting control unit 9b performs control to start a shooting operation in the imaging apparatus 1 with shooting parameter set by the parameter control unit 9a Specifically, if the 1st is input from the release switch 4b, the shooting control unit 9b causes the imaging apparatus 1 to execute the shooting preparation operation, and if the 2nd is input from the release switch 4b, the shooting control unit 9b causes the imaging apparatus 1 to execute the shooting operation with the shooting parameter set by the parameter control unit 9a. This shooting preparation operation refers to an operation of fixing a photometric value and/or a focal position of the imaging apparatus 1 by performing an automatic exposure process (hereinafter, referred to as "AE process") of automatically determining an exposure value of the imaging apparatus 1 and an automatic focus adjustment process (hereinafter, referred to as "AF process") of automatically determining a focus of the imaging apparatus 1. Further, the shooting operation refers to an operation of performing predetermined processing, for example, image processing including development processing, and compression processing, on the image data generated by the imaging unit 2, and recording them in the recording medium 8.

The display control unit 9c causes the display unit 6 to display an image corresponding to the image data generated by the imaging unit 2. Specifically, the display control unit 9c causes the display unit 6 to display, along a time series, the live view images corresponding to the image data continuously generated by the imaging unit 2. Further, the display control unit 9c causes the display unit 6 to display information related to the shooting functions allocated to the first operating unit 3 and second operating unit 4a, the information having been superimposed on the live view images.

Figure 3:
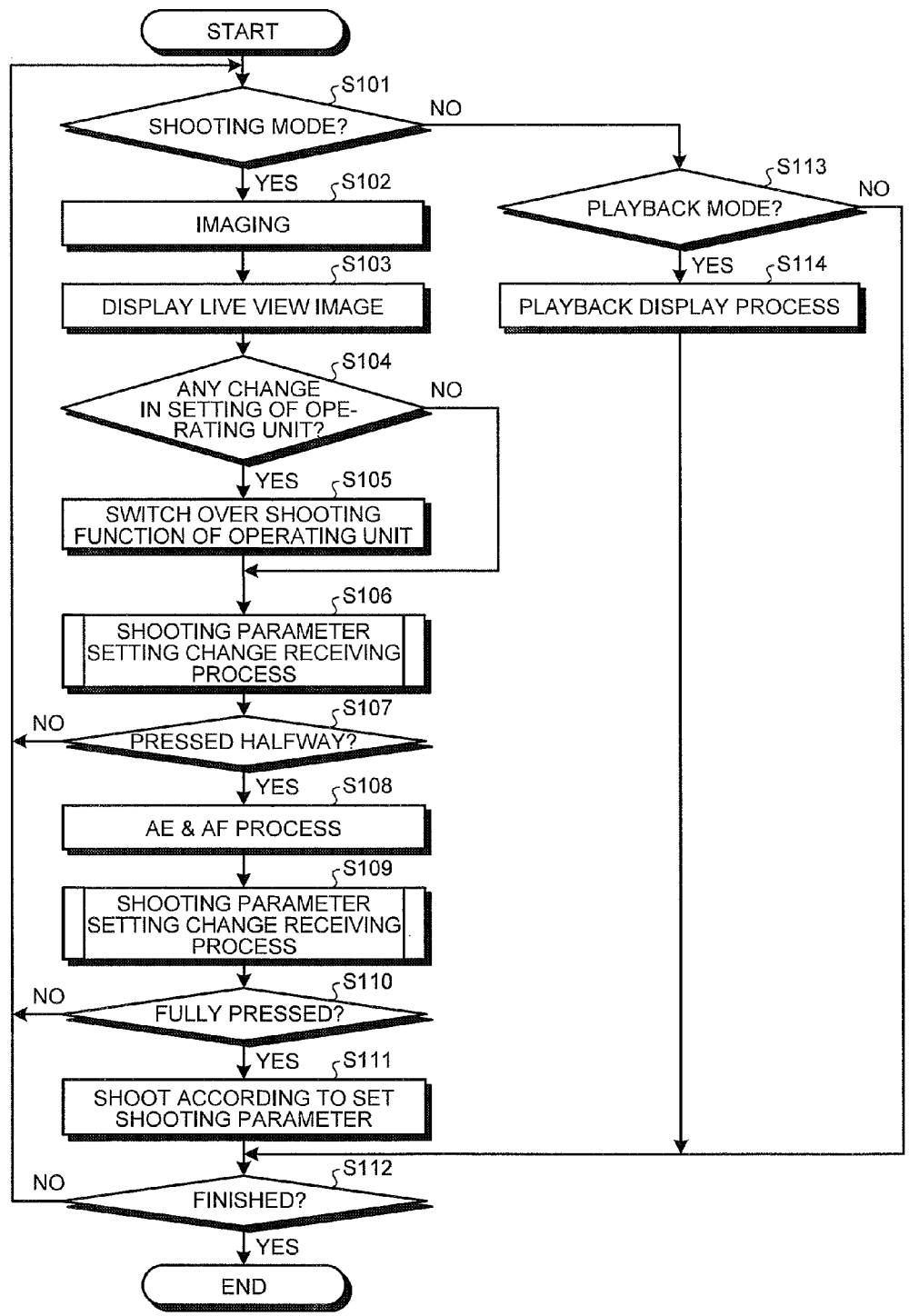
FIG. 3 is a flow chart illustrating an outline of a process executed by the imaging apparatus according to the first embodiment of the present invention.

A process executed by the imaging apparatus 1 having the above configuration will be described. FIG. 3 is a flow chart illustrating an outline of the process executed by the imaging apparatus 1.

As illustrated in FIG. 3, a case in which a shooting mode has been set in the imaging apparatus 1 (step S101: Yes) will be described. In this case, the imaging unit 2 executes imaging under control by the shooting control unit 9b (step S102).

Figure 4:
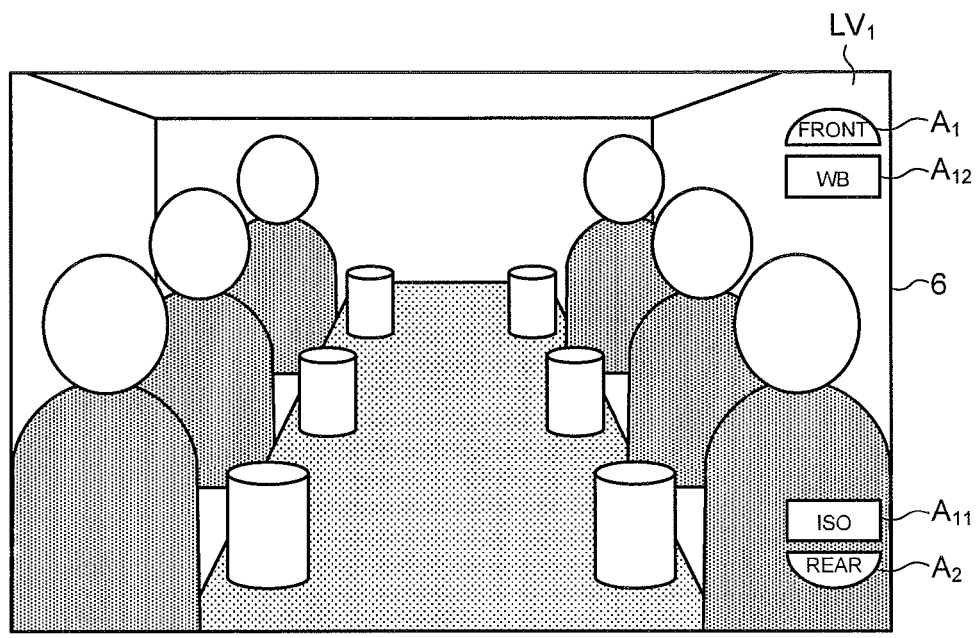
FIG. 4 is a diagram illustrating an example of an image displayed by a display unit of the imaging apparatus according to the first embodiment of the present invention.

Subsequently, the display control unit 9c causes the display unit 6 to display a live view image corresponding to the image data generated by the imaging unit 2 (step S103). Specifically, as illustrated in FIG. 4, the display control unit 9c causes the display unit 6 to display a live view image $LV_1$ corresponding to the image data generated by the imaging unit 2. When that is done, the display control unit 9c causes the display unit 6 to display information related to the shooting functions allocated to the first operating unit 3 and second operating unit 4a, the information having been superimposed on the live view image $LV_1$. Specifically, the display control unit 9c causes the display unit 6 to display an icon $A_{11}$ representing ISO sensitivity as a shooting function above an icon $A_2$ representing the first operating unit 3 and an icon $A_{12}$ representing white balance as a shooting function below an icon $A_1$ representing the second operating unit 4a, the icon $A_{11}$ and icon $A_{12}$ having been superimposed on the live view image $LV_1$.

Thereafter, the control unit 9 determines whether or not a change signal that changes a setting of the allocation of the respective shooting functions of the first operating unit 3 and second operating unit 4a has been input from the change instruction unit 5 (step S104). If the control unit 9 determines that the change signal that changes the setting of the allocation of the respective shooting functions of the first operating unit 3 and the second operating unit 4a of the release mechanism 4 has been input from the change instruction unit 5 (step S104: Yes), the imaging apparatus 1 proceeds to later described step S105. In contrast, if the control unit 9 determines that the change signal that changes the setting of the allocation of the respective shooting functions of the first operating unit 3 and second operating unit 4a of the release mechanism 4 has not been input from the change instruction unit 5 (step S104: No), the imaging apparatus 1 proceeds to later described step S106.

At step S105, the parameter control unit 9a switches over the shooting functions allocated respectively to the first operating unit 3 and second operating unit 4a to shooting functions corresponding to the change signal input from the change instruction unit 5. Specifically, if the change signal has been input from the change instruction unit 5, the parameter control unit 9a performs the switchover according to function allocation set by menus illustrated in FIG. 5A to FIG. 5D. The setting menus illustrated in FIG. 5A to FIG. 5D are displayed by pressing a menu button (not illustrated) of the change instruction unit 5 and manipulating a cross button (not illustrated). By the setting menus illustrated in FIG. 5A to FIG. 5D, respective shooting modes (P-mode, A-mode, S-mode, and M-mode) are able to be specified, and functions of a front dial (first operating unit) and a rear dial (second operating unit) in A-state, in B-state, and upon being pressed halfway are able to be defined for each shooting mode. A selection of a function is performed by up and down buttons of the cross button, and a change among the respective shooting modes and a selection between the front dial and rear dial in each state is performed by left and right buttons of the cross button. For the functions to be defined, shooting parameters necessary for picture forming, such as exposure compensation, Ps (P-shift), aperture, shutter speed, ISO sensitivity, WB, contrast, chrome, and sharpness, are respectively set, as necessary, by a user. When actual shooting is performed, the setting of the rear dial upon being half pressed is particularly important, and usually, exposure compensation, aperture, shutter speed, and the like are preferably defined.

Figure 5A:
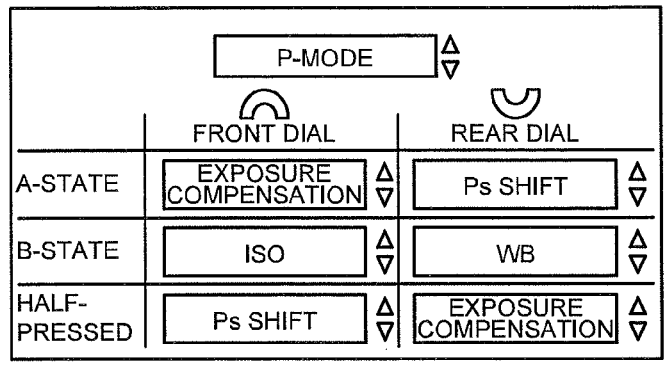
FIG. 5A is a diagram illustrating an example of a menu image of P-mode displayed by the display unit of the imaging apparatus according to the first embodiment of the present invention.
Figure 5B:
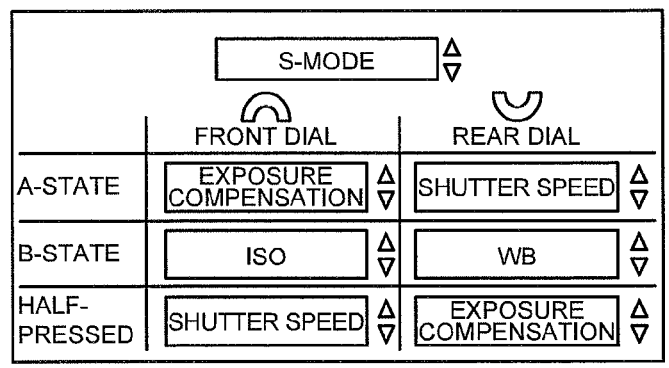
FIG. 5B is a diagram illustrating an example of a menu image of S-mode displayed by the display unit of the imaging apparatus according to the first embodiment of the present invention.
Figure 5C:
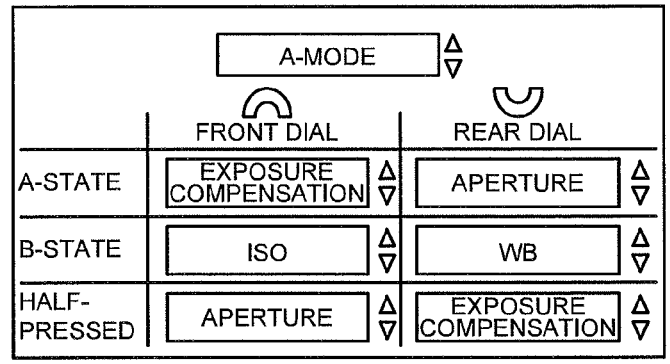
FIG. 5C is a diagram illustrating an example of a menu image of A-mode displayed by the display unit of the imaging apparatus according to the first embodiment of the present invention.
Figure 5D:
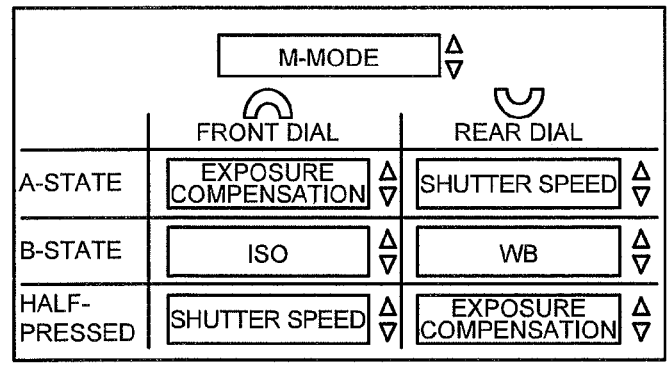
FIG. 5D is a diagram illustrating an example of a menu image of M-mode displayed by the display unit of the imaging apparatus according to the first embodiment of the present invention.
Figure 5E:
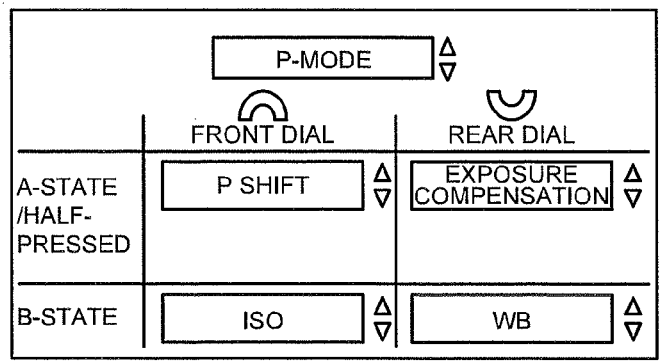
FIG. 5E is a diagram illustrating an example of another menu image of P-mode displayed by the display unit of the imaging apparatus according to the first embodiment of the present invention.
Figure 5F:
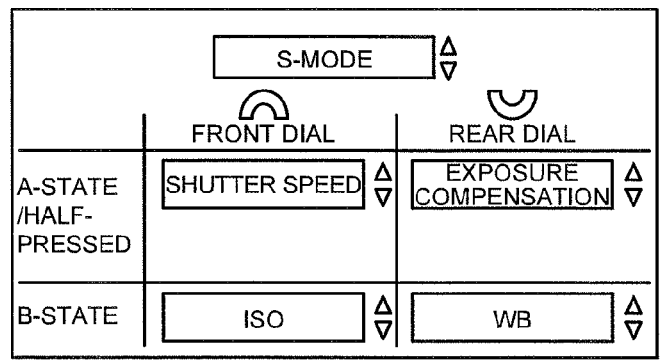
FIG. 5F is a diagram illustrating an example of another menu image of S-mode displayed by the display unit of the imaging apparatus according to the first embodiment of the present invention.
Figure 5G:
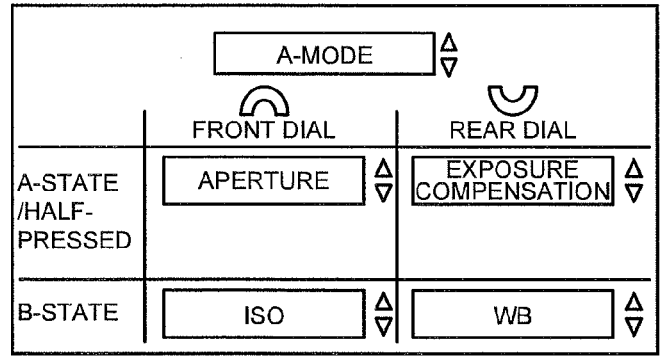
FIG. 5G is a diagram illustrating an example of another menu image of A-mode displayed by the display unit of the imaging apparatus according to the first embodiment of the present invention.
Figure 5H:
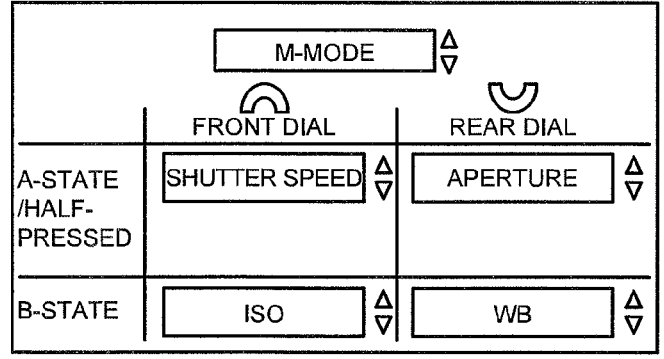
FIG. 5H is a diagram illustrating an example of another menu image of M-mode displayed by the display unit of the imaging apparatus according to the first embodiment of the present invention.

While viewing a menu screen illustrated in FIG. 5A, a user manipulates the cross button of the change instruction unit 5 to thereby allocate desired shooting functions respectively to the first operating unit 3 and the second operating unit 4a of the release mechanism 4. When this is done, the parameter control unit 9a allocates the shooting functions according to the menu screen to the first operating unit 3 and the second operating unit 4a of the release mechanism 4. Specifically, in P-mode illustrated in FIG. 5A, the parameter control unit 9a allocates to the first operating unit 3, in the A-state, exposure compensation as a shooting function when the release switch 4b is pressed halfway and P-shift as a shooting function at a normal time. In the B-state, exposure compensation as a shooting function when the release switch 4b is pressed halfway and WB as a shooting function at a normal time are allocated to the first operating unit 3. Thereby, the user is able to allocate desired shooting functions to the first operating unit 3 and second operating unit 4a.

FIG. 5E to FIG. 5H are examples in which an effect of simplifying a user interface and reducing a storage capacity of a camera is obtained by defining A-state as a half pressed state.

By this configuration, understandability for a user is improved and realization with lower cost is possible.

Figure 6:
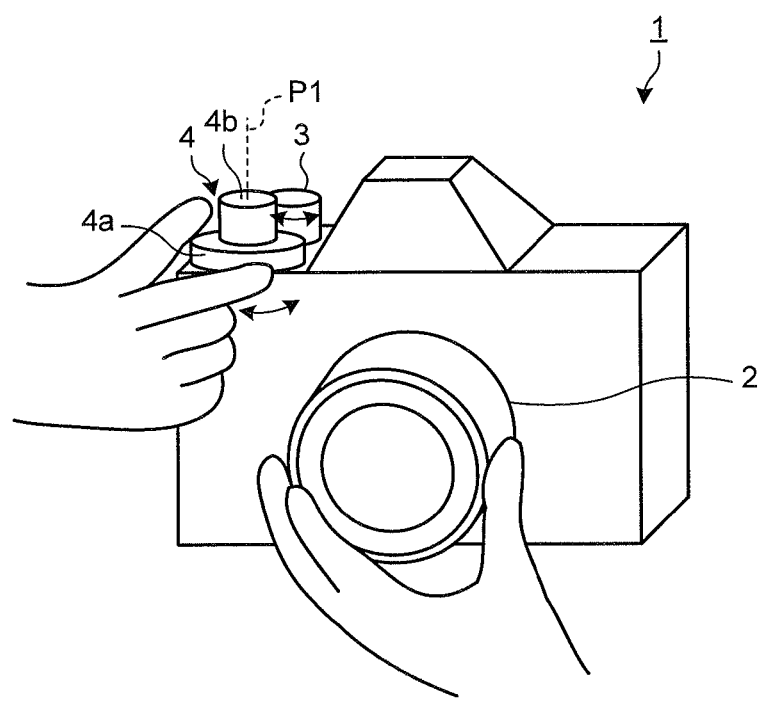
FIG. 6 is a diagram illustrating a situation in which a shooting parameter is changed by operating a second operating unit of the imaging apparatus according to the first embodiment of the present invention.

Subsequently, the imaging apparatus 1 executes, according to manipulation on the first operating unit 3 and second operating unit 4a, a shooting parameter setting change receiving process of changing, by the parameter control unit 9a, a setting of shooting parameters of shooting functions respectively allocated to the first operating unit 3 and second operating unit 4a (step S106). For example, as illustrated in FIG. 6, the user manipulates the second operating unit 4a and changes the shooting parameter of the shooting function allocated to the second operating unit 4a. Details of the shooting parameter setting change receiving process will be described later.

Thereafter, if the release switch 4b is pressed halfway by the user (step S107: Yes), the shooting control unit 9b executes each of the AE process and AF process (step S108).

When this is done, the shooting control unit 9b fixes a photometric value by the AE process and a focal position by the AF process.

Subsequently, the imaging apparatus 1 executes the shooting parameter setting receiving process (step S109). The details of the shooting parameter setting change receiving process will be described later.

Thereafter, if the release switch 4b is fully pressed by the user (step S110: Yes), the shooting control unit 9b performs shooting according to the set shooting parameter set by the parameter control unit 9a (step S111).

Subsequently, if ending is performed by a power switch (not illustrated) being manipulated and the power of the imaging apparatus 1 being turned OFF (step S112: Yes), the imaging apparatus 1 ends this process. On the contrary, if the power switch (not illustrated) is not manipulated and ending is not performed (step S112: No), the imaging apparatus 1 returns to step S101.

At step S107, if the release switch 4b has not been pressed halfway by the user (step S107: No), the imaging apparatus 1 returns to step S101.

At step S110, if the release switch 4b has not been fully pressed by the user (step S110: No), the imaging apparatus 1 returns to step S101.

At step S101, if the imaging apparatus 1 has not been set to a shooting mode (step S101: No) and the imaging apparatus 1 has been set to a playback mode (step S113: Yes), the display control unit 9c executes a playback display process of causing the display unit 6 to display the image corresponding to the image data recorded in the recording medium 8 (step S114). After step S114, the imaging apparatus 1 proceeds to step S112.

At step S101, if the imaging apparatus 1 has not been set to the shooting mode (step S101: No) and the imaging apparatus 1 has not been set to the playback mode (step S113: No), the imaging apparatus 1 proceeds to step S112.

Figure 7:
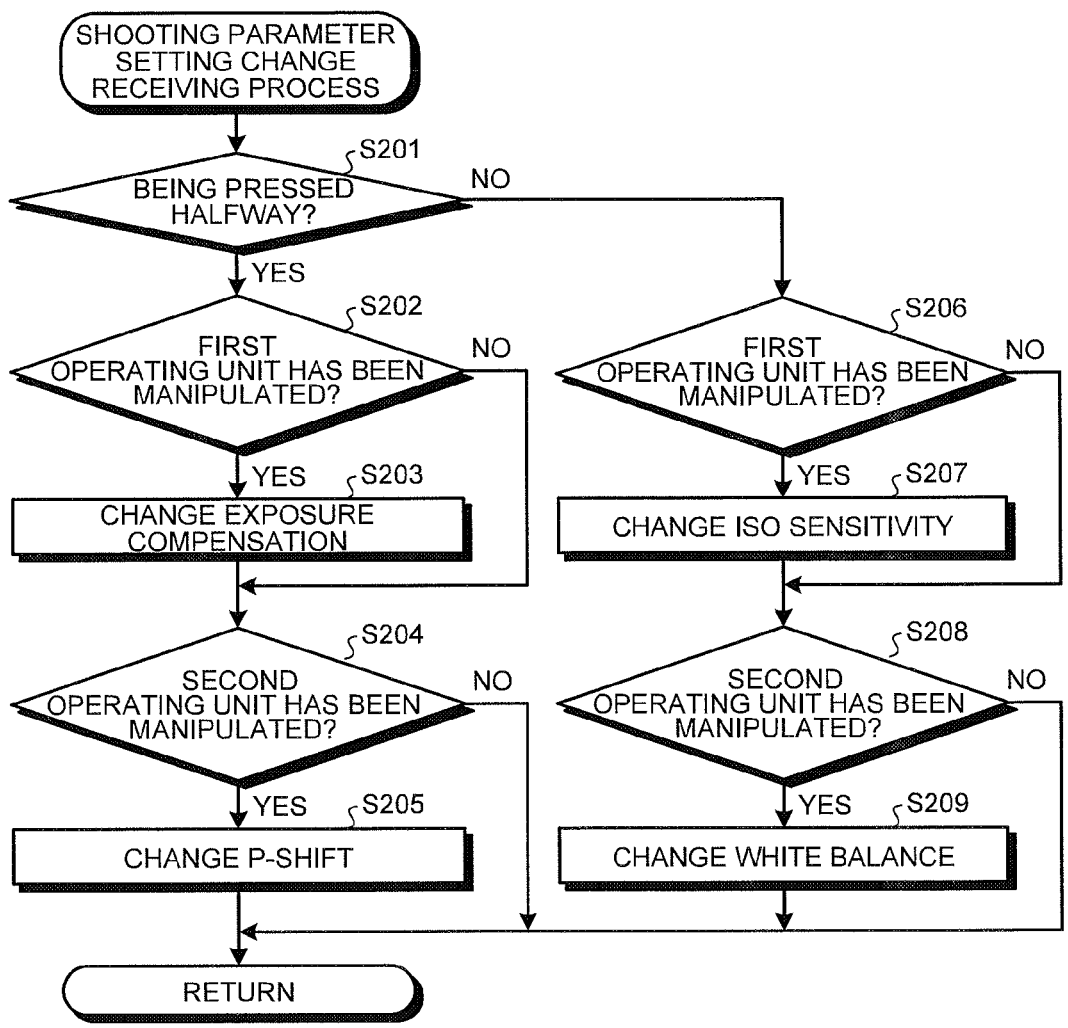
FIG. 7 is a flow chart illustrating an outline of a shooting parameter setting change receiving process of FIG. 3.

Next, the shooting parameter setting change receiving process of step S106 and step S109 of FIG. 3 will be described. FIG. 7 is a flow chart illustrating an outline of the shooting parameter change receiving process.

As illustrated in FIG. 7, while the release switch 4b is being pressed halfway by the user (step S201: Yes), if the first operating unit 3 is manipulated (step S202: Yes), the parameter control unit 9a changes the exposure compensation, according to the manipulation on the first operating unit 3 by the user (step S203).

Figure 8:
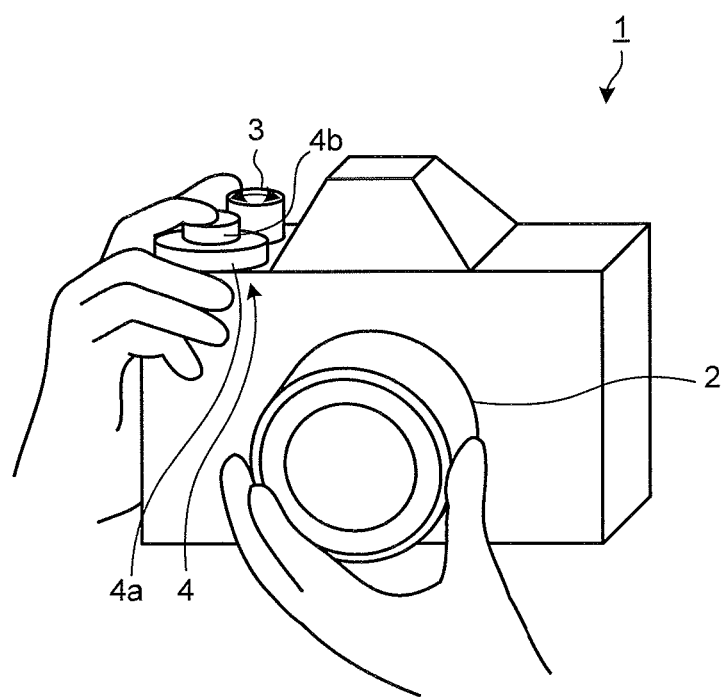
FIG. 8 is a diagram schematically illustrating a situation of manipulating a first operating unit in a state in which a release switch of the imaging apparatus according to the first embodiment of the present invention has been pressed halfway.
Figure 9:
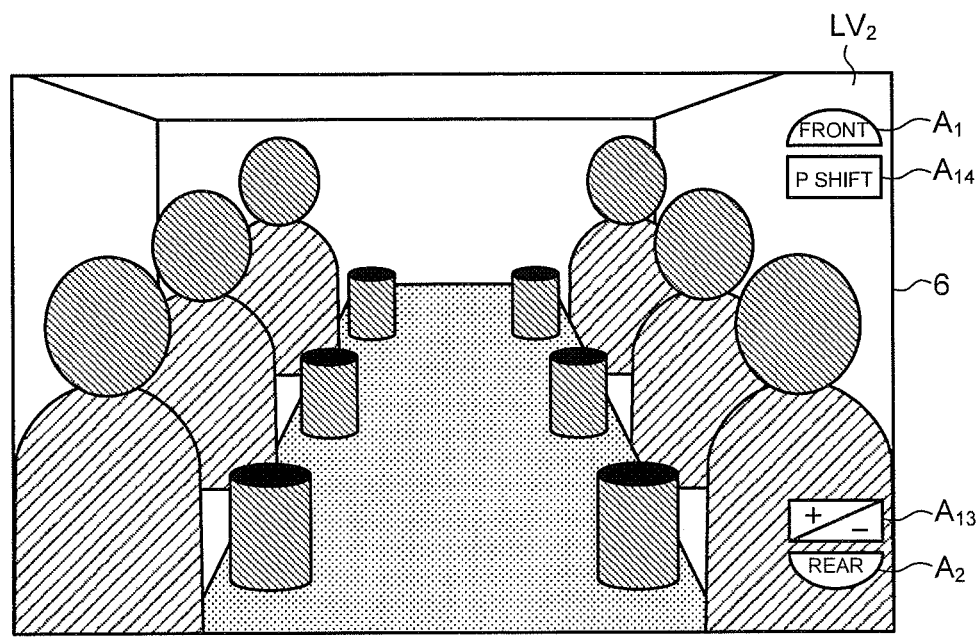
FIG. 9 is a diagram illustrating an example of a live view image displayed by the display unit when the first operating unit is manipulated in a state in which the release switch of the imaging apparatus according to the first embodiment of the present invention has been pressed halfway.

FIG. 8 is a diagram schematically illustrating a situation in which a user manipulates the first operating unit 3 in a state in which the user has pressed the release switch 4b halfway. FIG. 9 is a diagram illustrating an example of a live view image displayed by the display unit 6 when the user manipulates the first operating unit 3 in a state in which the user has pressed the release switch 4b halfway.

As illustrated in FIG. 8, even in a state in which the user has pressed the release switch 4b halfway with the index finger of the right hand while supporting the imaging apparatus 1 with the left hand and a focal position and an exposure with respect to a subject have been determined (see, for example, the live view image LV$_1$ of FIG. 4), the user may predict a finished result of picture forming of the image and want to change to a shooting function having a shooting parameter conforming to a shooting condition of the subject. However, as illustrated in FIG. 8, since the user is pressing the release switch 4b halfway with the index finger of the right hand while supporting the imaging apparatus 1 with the left hand, if, for example, the shooting condition of the subject is changed or it is determined that desired picture forming is not possible when a shooting function, which is able to change a shooting parameter having a high priority in the finishing of picture forming of the image, has not been assigned to the first operating unit 3, it is not possible to easily change to a shooting function having a shooting parameter conforming to the change in the shooting condition of the subject or desired picture forming. In this case, the user must take the index finger off from the release switch 4b and perform re-allocation of a shooting function of the first operating unit 3 again or manipulate the second operating unit 4a, and may miss a shutter chance of the subject or do an incorrect manipulation when changing the allocation of the respective shooting functions to the first operating unit 3 and second operating unit 4a.

Accordingly, in this first embodiment, the parameter control unit 9a switches over the shooting function of the first operating unit 3 if the release switch 4b is pressed halfway. Thereby, as illustrated in FIG. 8, even if the shooting condition of the subject is changed or it is determined that a desired finished result is wanted, in a state in which the release switch 4b has been pressed halfway with the index finger of the right hand and the focus and photometric value with respect to the subject have been determined (are in a fixed state), the first operating unit 3 is able to be manipulated by the thumb only, and thus it is possible to change to a shooting function having a shooting parameter conforming to the change in the shooting condition of the subject or the desired finishing. Further, as illustrated in FIG. 8, since the user is taking a shooting posture with the release switch 4b being pressed halfway with the index finger, the user is able to infallibly shoot the subject with the shooting parameter that is able to reflect the desired finishing without missing the shutter chance.

Further, as illustrated by a live view image LV$_2$ of FIG. 9, the parameter control unit 9a changes the exposure compensation of the imaging unit 2 according to the manipulation on the first operating unit 3. When that is done, the display control unit 9c causes the display unit 6 to display information on the shooting functions allocated to the first operating unit 3 and second operating unit 4a, the information having been superimposed on the live view image LV$_2$. Specifically, the display control unit 9c causes the display unit 6 to display information representing a positional relation between an icon A$_{13}$ representing exposure compensation as a shooting function above the icon A$_2$ representing the first operating unit 3 and an icon A$_{14}$ representing P-shift as a shooting function below the icon A$_1$ representing the second operating unit 4a, the information having been superimposed on the live view image LV$_2$. Thereby, the user is able to make reflection to the desired finishing while viewing the live view image LV$_2$ displayed by the display unit 6. Further, the user is able to instinctively grasp that the respective shooting functions of the first operating unit 3 and second operating unit 4a have been switched over, by checking the icon A$_{13}$ and icon A$_{14}$ displayed by the display unit 6. Furthermore, the user is able to instinctively grasp the positional relation between the first operating unit 3 and second operating unit 4a.

After step S203, if the second operating unit 4a is manipulated by the user (step S204: Yes), the parameter control unit 9a changes the P-shift of exposure control value of the imaging unit 2 (step S205). The P-shift means changing a relation between the shutter speed and aperture value according to brightness of the subject (changing the value of the program diagram). After step S205, the imaging apparatus 1 returns to a main routine of FIG. 3.

At step S202, if the first operating unit 3 has not been manipulated by the user (step S202: No), the imaging apparatus 1 proceeds to step S204.

At step S204, if the second operating unit 4a has not been manipulated by the user (step S204: No), the imaging apparatus 1 returns to the main routine of FIG. 3.

At step S201, when the release switch 4b is not being pressed halfway by the user (step S201: No) and the operating unit 3 is manipulated (step S206: Yes), the parameter control unit 9a changes the ISO sensitivity of the imaging unit 2, according to the manipulation on the first operating unit 3 by the user (step S207).

Subsequently, if the second operating unit 4a has been manipulated by the user (step S208: Yes), the parameter control unit 9a changes the white balance of the imaging unit 2, according to the manipulation on the second operating unit 4a (step S209).

At step S206, if the first operating unit 3 has not been manipulated by the user (step S206: No), the imaging apparatus 1 proceeds to step S208.

At step S208, if the second operating unit 4a has not been manipulated by the user (step S208: No), the imaging apparatus 1 returns to the main routine of FIG. 3.

According to the above described first embodiment of the present invention, if the 1st is input from the release switch 4b, the parameter control unit 9a switches over the shooting function that has been allocated to the first operating unit 3. Thereby, picture forming conforming to the change in the shooting condition of the subject upon shooting is possible.

Further, according to the first embodiment of the present invention, since the parameter control unit 9a switches over the shooting function of the first operating unit 3 after the imaging apparatus 1 has fixed the focal position and photometric value with respect to the subject, it is possible to shoot something for which finishing of picture forming of the image has been further performed from the state in which the composition of the subject has been determined.

Further, according to the first embodiment of the present invention, since the release switch 4b is provided on the axis P1 of the second operating unit 4a, it is possible to easily change, by the first operating unit 3, to a shooting function having a shooting parameter that is most reflected in the finished result of the picture forming while the release switch 4b is being pressed halfway.

Further, according to the first embodiment of the present invention, the parameter control unit 9a allocates different shooting functions to the first operating unit 3 and second operating unit 4a respectively and switches over the shooting functions according to the 1st from the release switch 4b. As a result, without increasing the number of operating members, the number of the operating units are virtually increased, and thus downsizing while maintaining the operability is possible.

Second Embodiment

Next, a second embodiment of the present invention will be described. An imaging apparatus according to the second embodiment is different from the above described imaging apparatus 1 according to the first embodiment in configuration and in shooting parameter setting change receiving process. Therefore, hereinafter, after describing the configuration of the imaging apparatus according to this second embodiment, the shooting parameter setting change receiving process executed by the imaging apparatus will be described. The same signs will be appended to structural components similar to those of the above described imaging apparatus 1 according to the first embodiment and description thereof will be omitted.

Figure 10:
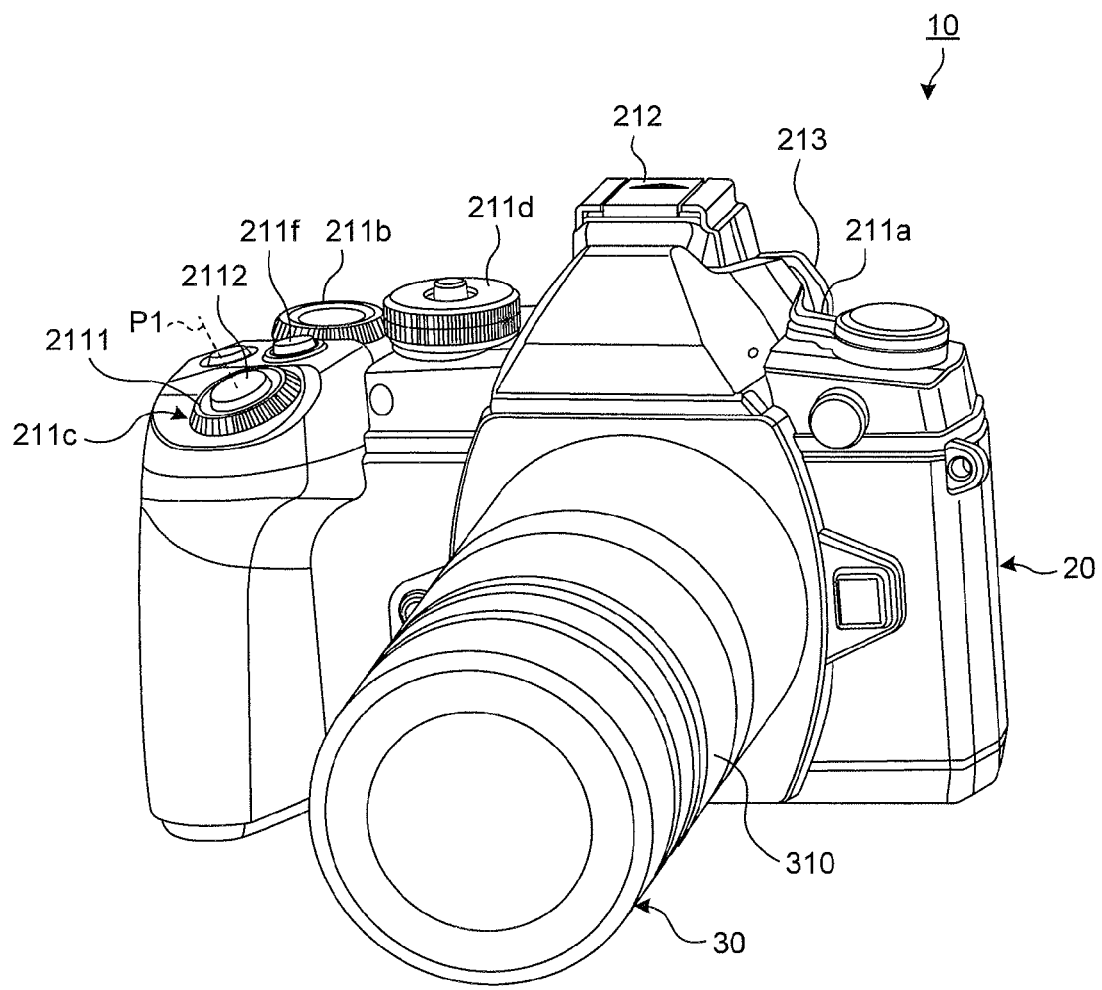
FIG. 10 is a perspective diagram illustrating a configuration of a subject facing side of an imaging apparatus according to a second embodiment of the present invention.
Figure 11:
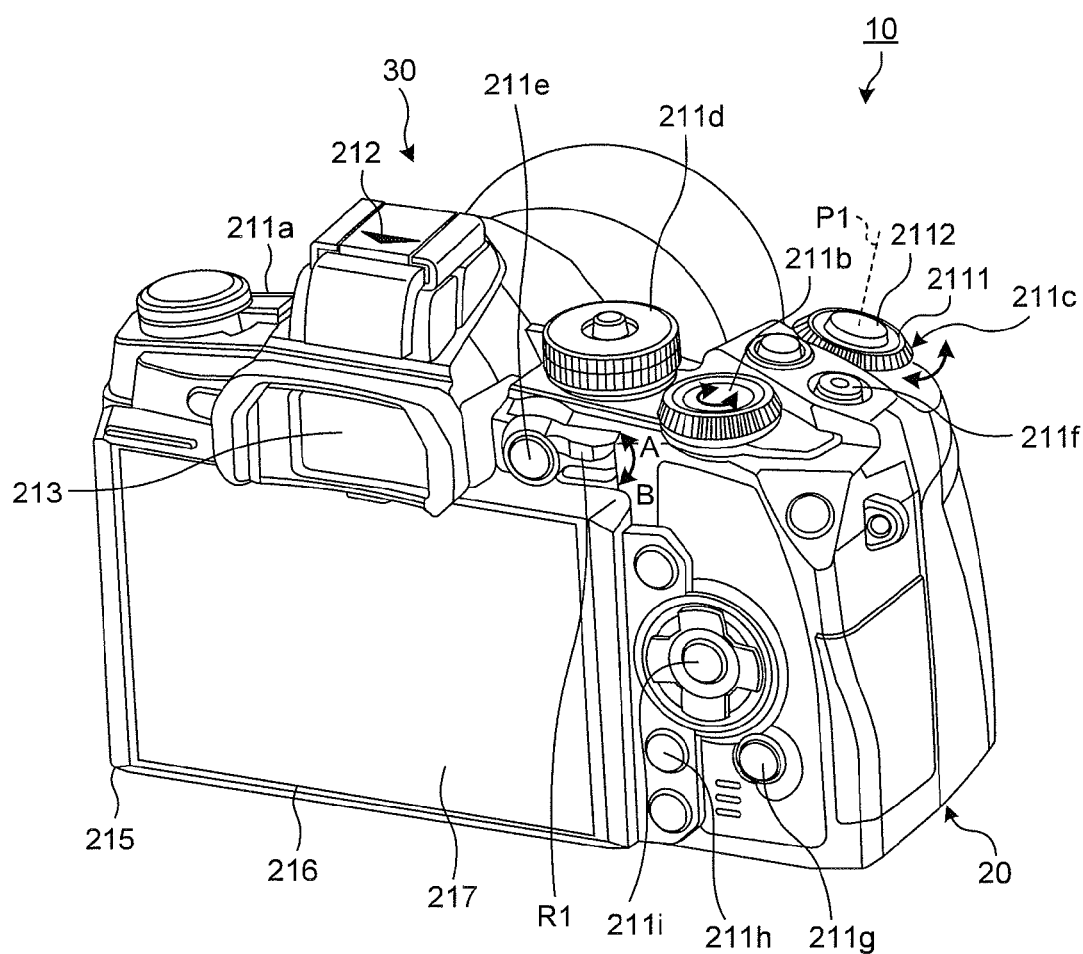
FIG. 11 is a perspective diagram illustrating a configuration of a photographer side of the imaging apparatus according to the second embodiment of the present invention.
Figure 12:
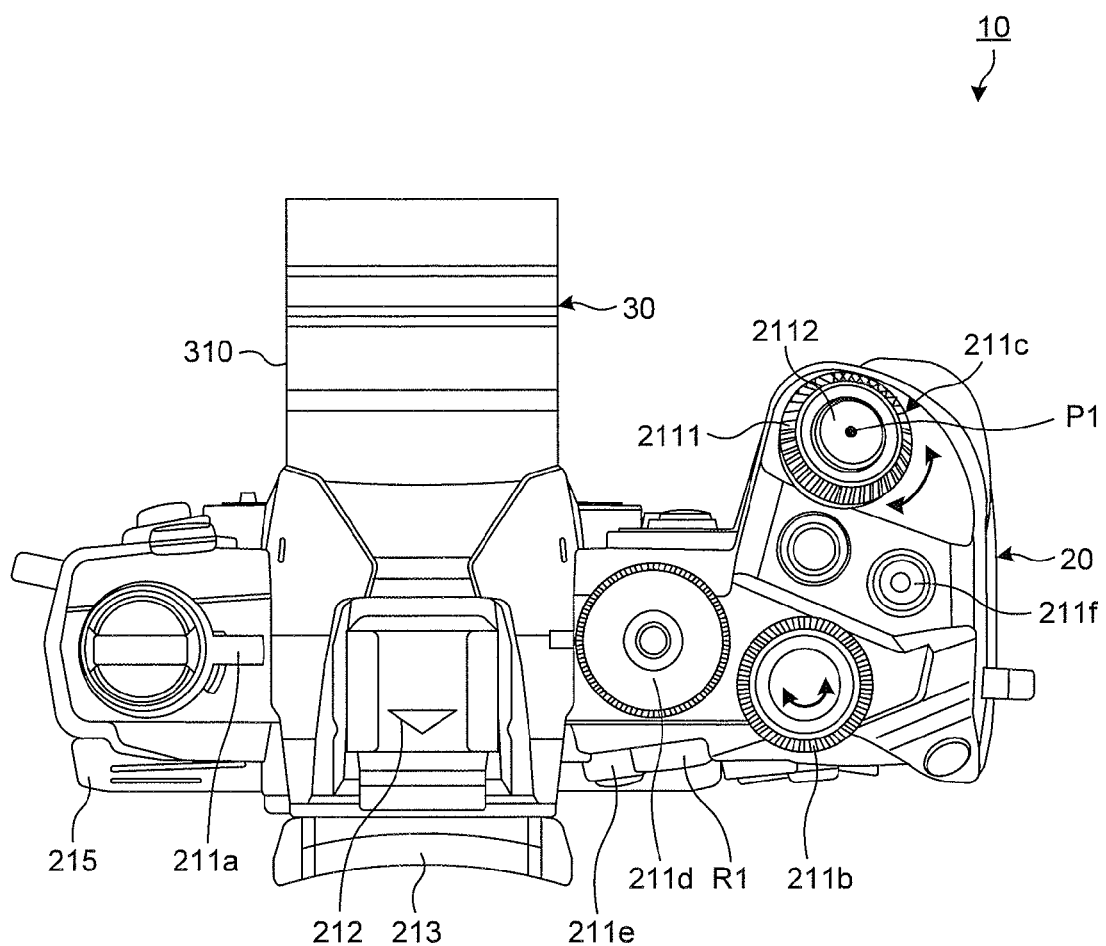
FIG. 12 is a front view illustrating a configuration of a top face of the imaging apparatus according to the second embodiment of the present invention.
Figure 13:
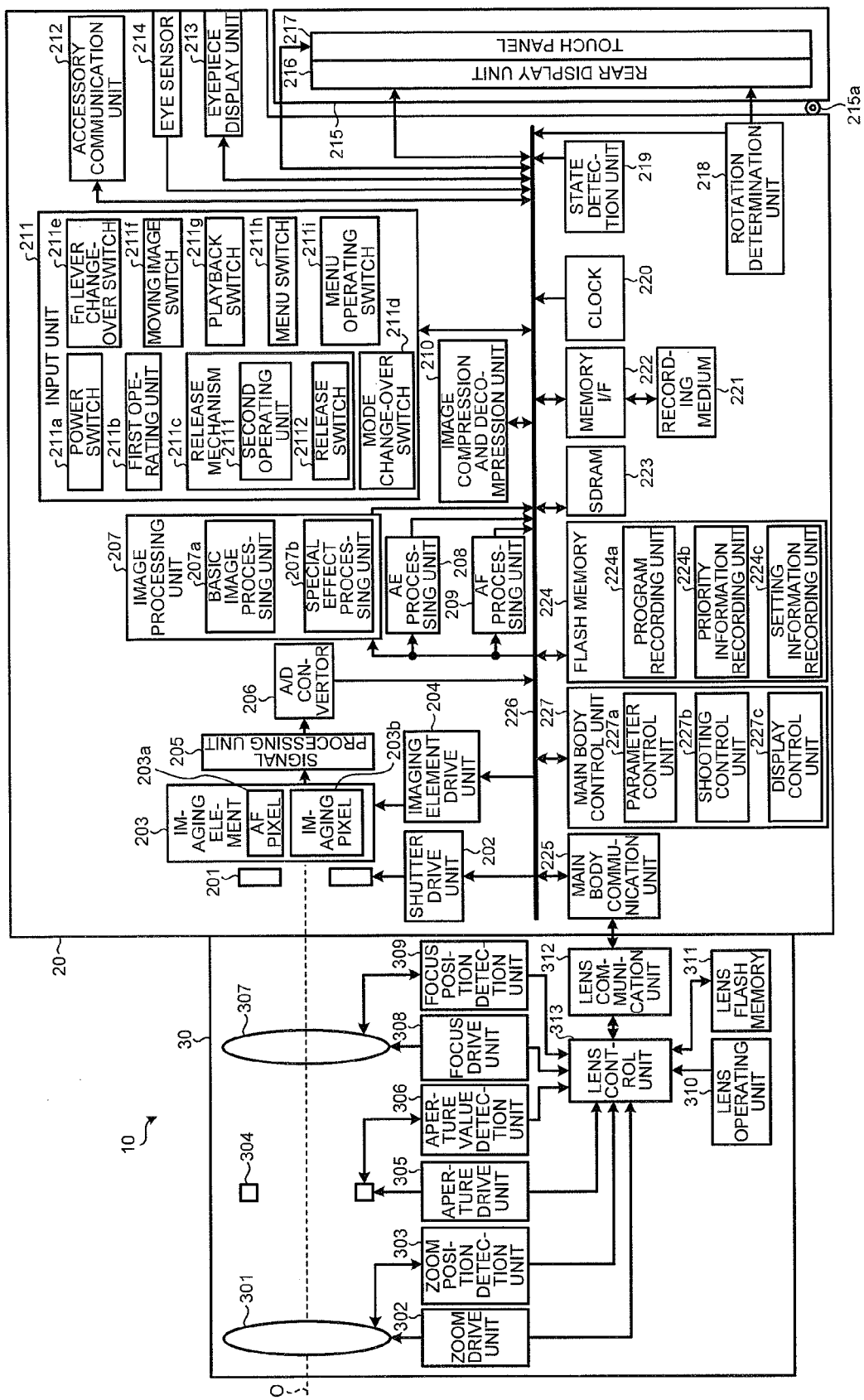
FIG. 13 is a block diagram illustrating a functional configuration of the imaging apparatus according to the second embodiment of the present invention.

FIG. 10 is a perspective diagram illustrating a configuration of a subject facing side (front side) of the imaging apparatus according to the second embodiment of the present invention. FIG. 11 is a perspective diagram illustrating a configuration of a photographer facing side (rear side) of the imaging apparatus according to the second embodiment of the present invention. FIG. 12 is a front view illustrating a configuration of a top face of the imaging apparatus according to the second embodiment of the present invention. FIG. 13 is a block diagram illustrating a functional configuration of the imaging apparatus according to the second embodiment of the present invention.

An imaging apparatus 10 illustrated in FIG. 10 to FIG. 13 includes: a main body unit 20; and a lens unit 30, which is freely attachable and detachable via a mount ring (not illustrated) provided in the main body unit 20, forms a subject image, and is optically zoomable.

First, the main body unit 20 will be described. The main body unit 20 includes a shutter 201, a shutter drive unit 202, an imaging element 203, an imaging element drive unit 204, a signal processing unit 205, an A/D converter 206, an image processing unit 207, an AE processing unit 208, an AF processing unit 209, an image compression and decompression unit 210, an input unit 211, an accessory communication unit 212, an eyepiece display unit 213, an eye sensor 214, a movable unit 215, a rear display unit 216, a touch panel 217, a rotation determination unit 218, a state detection unit 219, a clock 220, a recording medium 221, a memory I/F 222, an SDRAM 223, a Flash memory 224, a main body communication unit 225, a bus 226, and a main body control unit 227.

The shutter 201 sets a state of the imaging element 203 to an exposed state or shaded state. The shutter 201 is configured by using a mechanical shutter, such as a focal plane shutter.

The shutter drive unit 202 drives the shutter 201 according to an instruction signal input from the main body control unit 227. The shutter drive unit 202 is configured by using a stepping motor, a DC motor, or the like.

The imaging element 203 is configured by using a complementary metal oxide semiconductor (CMOS) having therein a plurality of pixels, which output electric signals by optically receiving light condensed by the lens unit 30 and performing photoelectric conversion thereon and are arranged two-dimensionally, or the like. Under control by the main body control unit 227, the imaging element 203 continuously generates and outputs to the signal processing unit 205, image data, at a predetermined frame rate, for example, at 30 fps. Further, the imaging element has: an AF pixel 203a (pixel for detecting a focus), which generates a focal point signal (hereinafter, referred to as "focal point data") used when the imaging apparatus 10 performs a distance measuring process of detecting a distance to the subject by a phase difference detection method and an imaging plane phase difference AF process of adjusting a focal point of the lens unit 30; and an imaging pixel 203b, which optically receives the subject image at an imaging plane and generates an electrical signal (hereinafter, referred to as "image data").

The AF pixel 203a is configured by using a photodiode, an amplification circuit, and the like, and is provided on the imaging plane of the imaging element 203 at predetermined intervals in a predetermined area. For example, the AF pixel 203a is provided in an AF area or central area at predetermined intervals on a light receiving surface of the imaging element 203.

The imaging pixel 203b is configured by using a photodiode, an amplification circuit, and the like. The imaging pixels 203b generates image data by optically receiving a subject image incident from the lens unit 30 and performing photoelectric conversion thereon.

The imaging element drive unit 204 causes the image data (analog signal) and focal point data (analog signal) from the imaging element 203 to be output at a predetermined timing to the signal processing unit 205. In that sense, the imaging element drive unit 204 functions as an electronic shutter.

The signal processing unit 205 performs analog processing on and outputs to the A/D converter 206, the image data and focal point data input from the imaging element 203. For example, with respect to the image data, the signal processing unit 205 performs gain-up such that an aimed brightness is obtained, after reducing the reset noise and the like and thereafter performing waveform shaping thereon.

The A/D converter 206 generates digital image data (RAW data) and focal point data by performing A/D conversion on the analog image data and focal point data input from the signal processing unit 205 and outputs them to the SDRAM 223 via the bus 226. In this second embodiment, the imaging element 203, the signal processing unit 205, and the A/D converter 206 function as an imaging unit.

The image processing unit 207 has a basic image processing unit 207a and a special effect processing unit 207b.

The basic image processing unit 207a acquires, via the bus 226, the image data (RAW data) from the SDRAM 223, and performs various image processing on the acquired image data. Specifically, the image processing unit 207 performs basic image processing including optical black subtraction processing, white balance (WB) adjustment processing, color matrix calculation processing, gamma correction processing, color reproduction processing, edge enhancement processing, and the like. For example, based on preset parameters of image processing, the basic image processing unit 207a performs the image processing. The parameters of image processing are values of contrast, sharpness, chroma, white balance, and tone. The basic image processing unit 207a performs synchronization processing of image data if the imaging element 203 is a Bayer array. The basic image processing unit 207a outputs, via the bus 226, the processed image data to the SDRAM 223 or rear display unit 216.

The special effect processing unit 207b performs special effect processing that causes visual effects to generate processed image data, by combining a plurality of kinds of image processing for one set of image data. The kinds of image processing combined in the special effect processing are, for example, any one or more of: blurring processing, shading addition processing, noise superimposing processing, chroma change processing, and contrast enhancement processing.

The AE processing unit 208 acquires, via the bus 226, the image data recorded in the SDRAM 223, and based on the acquired image data, sets an exposure condition for when the imaging apparatus 10 performs still image shooting or moving image shooting. Specifically, the AE processing unit 208 calculates brightness from the image data and based on the calculated brightness, determines, for example, an aperture value, a shutter speed, and an ISO sensitivity, to thereby perform automatic exposure of the imaging apparatus 1.

The AF processing unit 209 acquires, via the bus 226, the focal point data recorded in the SDRAM 223, and based on the acquired focal point data, performs adjustment of automatic focusing of the imaging apparatus 10. For example, the AF processing unit 209 calculates, based on the focal point data, a defocus amount of the lens unit 30 by performing a distance measuring calculation process up to the subject, and according to a result of this calculation, performs a phase difference AF process (imaging plane phase difference AF method) of performing adjustment of automatic focusing of the imaging apparatus 10. The AF processing unit 209 may perform the adjustment of the automatic focusing of the imaging apparatus 10 by taking out a signal of a high frequency component from the image data, performing an auto focus (AF) calculation process (contrast AF method) on the signal of the high frequency component, to thereby determines focusing evaluation of the imaging apparatus 10. Further, the AF processing unit 209 may perform the adjustment of the automatic focusing of the imaging apparatus 10 by using a pupil division phase difference method.

The image compression and decompression unit 210 acquires, via the bus 226, the image data or processed image data from the SDRAM 223, performs compression of the acquired image data according to a predetermined format, and outputs this compressed image data to the recording medium 221 via the memory I/F 222. The predetermined format is Joint Photographic Experts Group (JPEG) format, Motion JPEG format, MP4 (H. 264) format, or the like. Further, the image compression and decompression unit 210 acquires, via the bus 226 and memory I/F 222, the image data (compressed image data) recorded in the recording medium 221, and decompresses (expands) and outputs to the SDRAM 223 the acquired image data.

The input unit 211 has a power switch 211a, a first operating unit 211b, a release mechanism 211c, a mode change-over switch 211d, an Fn lever change-over switch 211e, a moving image switch 211f, a playback switch 211g, a menu switch 211h, and a menu operating switch 211i.

The power switch 211a switches over a power state of the imaging apparatus 10 to an ON state or OFF state.

The first operating unit 211b receives an input of an instruction signal that changes a shooting parameter of a shooting function that has been allocated thereto beforehand. The first operating unit 211b is provided on a photographer side on a top face of the imaging apparatus 10. The first operating unit 211b is rotatably provided around a predetermined axis. The first operating unit 211b is configured by using a dial type operating member. The shooting functions are the shooting parameters of the ISO sensitivity, white balance, combination (types) of image processing by the special effect processing unit 207b, AF method, AF area, and strobe. Further, the first operating unit 211b is provided on a photographer side on a top face of the imaging apparatus 10.

The release mechanism 211c has a second operating unit 2111 and a release switch 2112. The release mechanism 211c is provided on a subject side of the imaging apparatus 10 (main body unit 20) on the top face thereof.

The second operating unit 2111 receives an input of an instruction signal that changes a shooting parameter of a shooting function that has been allocated thereto beforehand. The second operating unit 2111 is provided on the subject side and top face of the imaging apparatus 10. The second operating unit 2111 is rotatably provided around a predetermined axis P1. The second operating unit 2111 is configured by using a dial type rotary member.

The release switch 2112 is able to be projected and depressed by an external pressing force, and receives an input of the 1st instructing the shooting preparation operation when pressed halfway and receives an input of the 2nd instructing shooting when fully pressed. The release switch 2112 is provided on the axis P1 of the second operating unit 2111 and integrally provided with the second operating unit 2111.

The mode change-over switch 211d receives an input of an instruction signal instructing switch over of a shooting mode settable to the imaging apparatus 10. Specifically, the mode change-over switch 211d receives an input of an instruction signal for switching the shooting mode to any of program mode (P-mode), manual mode (M-mode), aperture priority mode (A-mode), shutter priority mode (S-mode), special effect processing mode (Art-mode) and moving image mode. The mode change-over switch 211d is configured by using a dial type operating member, which is rotatable around a predetermined axis.

The Fn lever change-over switch 211e receives an input of an instruction signal switching over the shooting functions respectively allocated to the first operating unit 211b and second operating unit 2111. The Fn lever change-over switch 211e has a lever R1, which is movable to an A-position or B-position (see FIG. 11). The Fn lever change-over switch 211e receives the input of the instruction signal that switches over the shooting functions respectively allocated to the first operating unit 211b and second operating unit 2111 by the lever R1 being switched over from the A-position to the B-position. Specifically, the Fn lever change-over switch 211e switches between a first mode (A-position) for setting different shooting functions respectively to a plurality of operating members and a second mode (B-position) for setting shooting functions respectively to the plurality of operating members, the shooting functions being different from those of the first mode and the shooting functions being able to change at least shooting parameters of high priorities in the finished result of the image corresponding to the image data. For example, at least, in the first mode, a shooting function of white balance is set to the first operating unit 211b and a shooting function of ISO sensitivity is set to the second operating unit 2111, and in the second mode, a shooting function of exposure compensation is set to the first operating unit 211b and a shooting function of P-shift is set to the second operating unit 2111. In this second embodiment, the Fn lever change-over switch 211e functions as a change-over setting unit.

The moving image switch 211f receives an input of an instruction signal for instructing moving image shooting to the imaging apparatus 10.

The playback switch 211g receives an input of an instruction signal for performing playback by displaying the image data recorded in the recording medium 221 on the rear display unit 216 or eyepiece display unit 213.

The menu switch 211h receives an input of an instruction signal for displaying various settings of the imaging apparatus 10 on the rear display unit 216 or eyepiece display unit 213.

The menu operating switch 211i receives an input of an instruction signal for switching over the various settings of the imaging apparatus 10.

In the input unit 211 configured as above, a drive switch for setting the AF method (drive mode), a bracket switch for instructing bracket shooting, a white balance switch for changing white balance, and the like may be provided.

The accessory communication unit 212 is a communication interface for performing communication with an external device inserted in the main body unit 20.

The eyepiece display unit 213 displays a live view image or playback image corresponding to image data recorded in the SDRAM 223 under the control by the main body control unit 227 via the bus 226. In that sense, the eyepiece display unit 213 functions as an electronic view finder (EVF). The eyepiece display unit 213 is configured by using a display panel formed of a liquid crystal or organic EL, a driver, and the like.

The eye sensor 214 detects approach of a user (object) to the eyepiece display unit 213 and outputs a result of this detection to the main body control unit 227. Specifically, the eye sensor 214 detects whether or not the user is checking an image with the eyepiece display unit 213. The eye sensor 214 is configured by using a contact sensor, an infrared sensor, or the like.

The movable unit 215 has the rear display unit 216 and touch panel 217 provided therein, and is movably provided on the main body unit 20 via a hinge 215a. For example, the movable unit 215 is provided on the main body unit 20 such that the rear display unit 216 is changeable to face upward or face downward with respect to a vertical direction of the main body unit 20.

Under control by the main body control unit 227, the rear display unit 216 acquires, via the bus 226, the image data recorded in the SDRAM 223 or the image data recorded in the recording medium 221, and displays an image corresponding to the acquired image data. Further, the rear display unit 216 displays, as appropriate, information related to operation information and shooting of the imaging apparatus 10.

The touch panel 217 is provided superimposed on a display screen of the rear display unit 216. The touch panel 217 detects a touch by an external object, and outputs a position signal corresponding to a position of this detected touch to the main body control unit 227. Further, the touch panel 217 may detect the position touched by the user based on the information displayed by the rear display unit 216, for example, an icon image or thumbnail image, and according to this detected touched position, may receive an input of an instruction signal for instructing an operation to be performed by the imaging apparatus 10 or a selection signal for selecting an image. In general, types of the touch panel 217 include a resistive film type, an electrostatic capacitance type, an optical type, and the like. In this second embodiment, any type of touch panel is applicable. Further, the movable unit 215, the rear display unit 216, and the touch panel 217 may be integrally formed.

The rotation determination unit 218 determines a rotation situation of the movable unit 215 and outputs this determination result to the main body control unit 227. For example, the rotation determination unit 218 determines whether or not the movable unit 215 has moved with respect to the main body unit 20 and outputs a result of this determination to the main body control unit 227.

The state detection unit 219 is configured by using an acceleration sensor and a gyro sensor, respectively detects an acceleration and an angular velocity generated in the imaging apparatus 10, and outputs a result of this detection to the main body control unit 227.

The clock 220 has a time measuring function and a function of determining a shooting date. The clock 220 outputs date data to the main body control unit 227, in order to add the date data to the image data captured by the imaging element 203.

The recording medium 221 is configured by using a memory card or the like, which is inserted from outside of the imaging apparatus 10. The recording medium 221 is freely detachably inserted in the imaging apparatus 10 via the memory I/F 222. In the recording medium 221, image data subjected to processing by the image processing unit 207 or image compression and decompression unit 210 are written. Further, from the recording medium 221, the recorded image data are read out by the main body control unit 227.

The SDRAM 223 temporarily records therein image data input from the A/D converter 206 via the bus 226, image data input from the image processing unit 207, and information being processed in the imaging apparatus 10. For example, the SDRAM 223 temporarily records therein image data sequentially output by the imaging element 203 frame by frame via the signal processing unit 205, A/D converter 206, and bus 226. The SDRAM 223 is configured by using a volatile memory.

The Flash memory 224 is configured by using a non-volatile memory. The Flash memory 224 has a program recording unit 224a, a priority information recording unit 224b, and a setting information recording unit 224c.

The program recording unit 224a stores therein various programs for operating the imaging apparatus 10, a program according to this second embodiment, various data used during execution of the programs, parameters of each image processing necessary for operations of image processing by the image processing unit 207, a combination of types of image processing of special effect processing, and the like.

The priority information recording unit 224b records therein shooting functions capable of changing shooting parameters of high priorities that the user wishes to reflect the most in finishing of picture making of an image corresponding to the image data generated by the imaging apparatus 10. Specifically, as shooting parameters having high priorities in a finished result of picture making, the priority information recording unit 224b records exposure compensation, shutter speed, aperture value, sharpness, contrast, and chroma. The shooting parameters are selected beforehand by the user's manipulation on the input unit 211 and recorded (registered) in the priority information recording unit 224b.

With respect to each of a plurality of shooting modes, the setting information recording unit 224c records therein shooting functions respectively allocated to the first operating unit 211b and second operating unit 211l and shooting functions respectively allocated to the first operating unit 211b and second operating unit 211l according to the user's settings.

The main body communication unit 225 is a communication interface for performing communication with the lens unit 30 attached to the main body unit 20.

The bus 226 is configured by using a transmission path or the like that connects among respective structural parts of the imaging apparatus 10. The bus 226 transfers various data generated inside the imaging apparatus 10 to each structural unit of the imaging apparatus 10.

The main body control unit 227 is configured by using a CPU, or the like. The main body control unit 227 comprehensively controls operations of the imaging apparatus 10 by performing transfer or the like of instructions and data corresponding to respective units forming the imaging apparatus 10 according to instruction signals from the input unit 211 or position signals from the touch panel 217.

A detailed configuration of the main body control unit 227 will be described. The main body control unit 227 has a parameter control unit 227a, a shooting control unit 227b, and a display control unit 227c.

The parameter control unit 227a sets a shooting parameter of the imaging apparatus 10 according to an instruction signal input from the first operating unit 211b or second operating unit 211l. Specifically, the parameter control unit 227a changes ISO sensitivity of the imaging element 203, if an instruction signal to change the ISO sensitivity is input from the first operating unit 211b.

Further, if a setting signal for setting respective shooting functions of the first operating unit 211b and second operating unit 211l is input from the menu operating switch 211i, the parameter control unit 227a refers to setting information recorded in the setting information recording unit 224c and switches over the shooting functions allocated to the first operating unit 211b and second operating unit 211l to the shooting functions corresponding to the setting signals from the menu operating switch 211i.

Further, the parameter control unit 227a switches over the shooting function allocated to the first operating unit 211b if the 1st is input from the release switch 211l2. Specifically, the parameter control unit 227a switches over to a shooting function having a high priority in a finished result of picture forming. Furthermore, when the shooting functions of the first mode have been set to the first operating unit 211b and second operating unit 211l by the Fn lever change-over switch 211e and the 1st is input from the release switch 211l2, the parameter control unit 227a switches over the respective shooting functions of the first operating unit 211b and second operating unit 211l to shooting functions of the second mode.

The shooting control unit 227b performs control to start a shooting operation in the imaging apparatus 10 with a shooting parameter set to the imaging apparatus 10 by the parameter control unit 227a, if the 2nd is input from the release switch 211l2. The shooting operation in the imaging apparatus 10 herein means an operation of performing, by the signal processing unit 205, A/D converter 206, and image processing unit 207, predetermined processing on the image data output by the imaging element 203 by driving of the shutter drive unit 202. Under control by the shooting control unit 227b, the image data subjected to the processing as above are compressed by the image compression and decompression unit 210 and recorded in the recording medium 221 via the bus 226 and memory I/F 222.

The display control unit 227c causes the rear display unit 216 and/or eyepiece display unit 213 to display an image corresponding to the image data. Specifically, if the power of the eyepiece display unit 213 is in the ON-state, the display control unit 227c causes the eyepiece display unit 213 to display the live view image corresponding to the image data, and if the power of the eyepiece display unit 213 is in the OFF-state, causes the rear display unit 216 to display the live view image corresponding to the image data. Further, the display control unit 227c causes the rear display unit 216 and/or eyepiece display unit 213 to display information related to shooting functions allocated to the first operating unit 211b and second operating unit 211l, the information having been superimposed on the live view image.

The main body unit 20 having the above configuration may include a sound input and output function, a flash function, a communication function enabling two-way communication with outside thereof, and the like.

Next, the lens unit 30 will be described. The lens unit 30 includes a zoom lens 301, a zoom drive unit 302, a zoom position detection unit 303, an aperture 304, an aperture drive unit 305, an aperture value detection unit 306, a focus lens 307, a focus drive unit 308, a focus position detection unit 309, a lens operating unit 310, a lens Flash memory 311, a lens communication unit 312, and a lens control unit 313.

The zoom lens 301 is configured by using one lens or a plurality of lenses. The zoom lens 301 changes a magnification of an optical zoom of the imaging apparatus 10 by moving along an optical axis "O" of the lens unit 30. For example, the zoom lens 301 is able to change the focal distance between a focal distance of 12 mm and a focal distance of 40 mm.

The zoom drive unit 302 is configured by using a DC motor, a stepping motor, or the like, and under control by the lens control unit 313, changes an optical zoom of the imaging apparatus 10 by moving the zoom lens 301 along the optical axis "O".

The zoom position detection unit 303 is configured by using a photo interrupter, or the like, detects a position of the zoom lens 301 on the optical axis "O", and outputs a result of this detection to the lens control unit 313.

The aperture 304 performs adjustment of exposure by limiting a quantity of incident light condensed by the zoom lens 301.

The aperture drive unit 305 is configured by using a stepping motor or the like, and under control by the lens control unit 313, changes an aperture value (F-value) of the imaging apparatus 10 by driving the aperture 304.

The aperture value detection unit 306 is configured by using a photo interrupter, an encoder, and the like, detects an aperture value from the current situation of the aperture 304, and outputs a result of this detection to the lens control unit 313.

The focus lens 307 is configured by using one lens or a plurality of lenses. The focus lens 307 changes a focal position of the imaging apparatus 10 by moving along the optical axis "O" of the lens unit 30.

The focus drive unit 308 is configured by using a DC motor, a stepping motor, or the like, and under control by the lens control unit 313, adjusts the focal position of the imaging apparatus 10 by moving the focus lens 307 along the optical axis "O".

The focus position detection unit 309 is configured by using a photo interrupter or the like, detects a position of the focus lens 307 on the optical axis "O", and outputs a result of this detection to the lens control unit 313.

As illustrated in FIG. 10, the lens operating unit 310 is a ring provided around a lens barrel of the lens unit 30, and receives an input of an instruction signal for instructing change in optical zoom of the lens unit 30 or an input of an instruction signal for instructing adjustment of focus in the lens unit 30. The lens operating unit 310 may be a push type switch, a lever type switch, or the like.

The lens Flash memory 311 records therein: a control program for respectively determining positions and movement of the zoom lens 301, aperture 304, and focus lens 307; lens properties of the lens unit 30; and various parameters. The lens properties herein include chromatic aberration, view angle information, brightness information, and focal distance information (for example, 12 mm to 40 mm), of the lens unit 30.

The lens communication unit 312 is a communication interface for performing communication with the main body communication unit 225 of the main body unit 20, when the lens unit 30 is attached to the main body unit 20.

The lens control unit 313 is configured by using a CPU, or the like. The lens control unit 313 controls operations of the lens unit 30 according to an instruction signal from the lens operating unit 310 or an instruction signal from the main body unit 20. Specifically, according to the instruction signal from the lens operating unit 310, the lens control unit 313 causes the focus drive unit 308 to be driven to perform focus adjustment by the focus lens 307, and cause the zoom drive unit 302 to be driven to perform change of zoom magnification of the optical zoom of the zoom lens 301. The lens control unit 313 may transmit lens properties of the lens unit 30 and identification information for identifying the lens unit 30 to the main body unit 20 when the lens unit 30 is attached to the main body unit 20.

Figure 14:
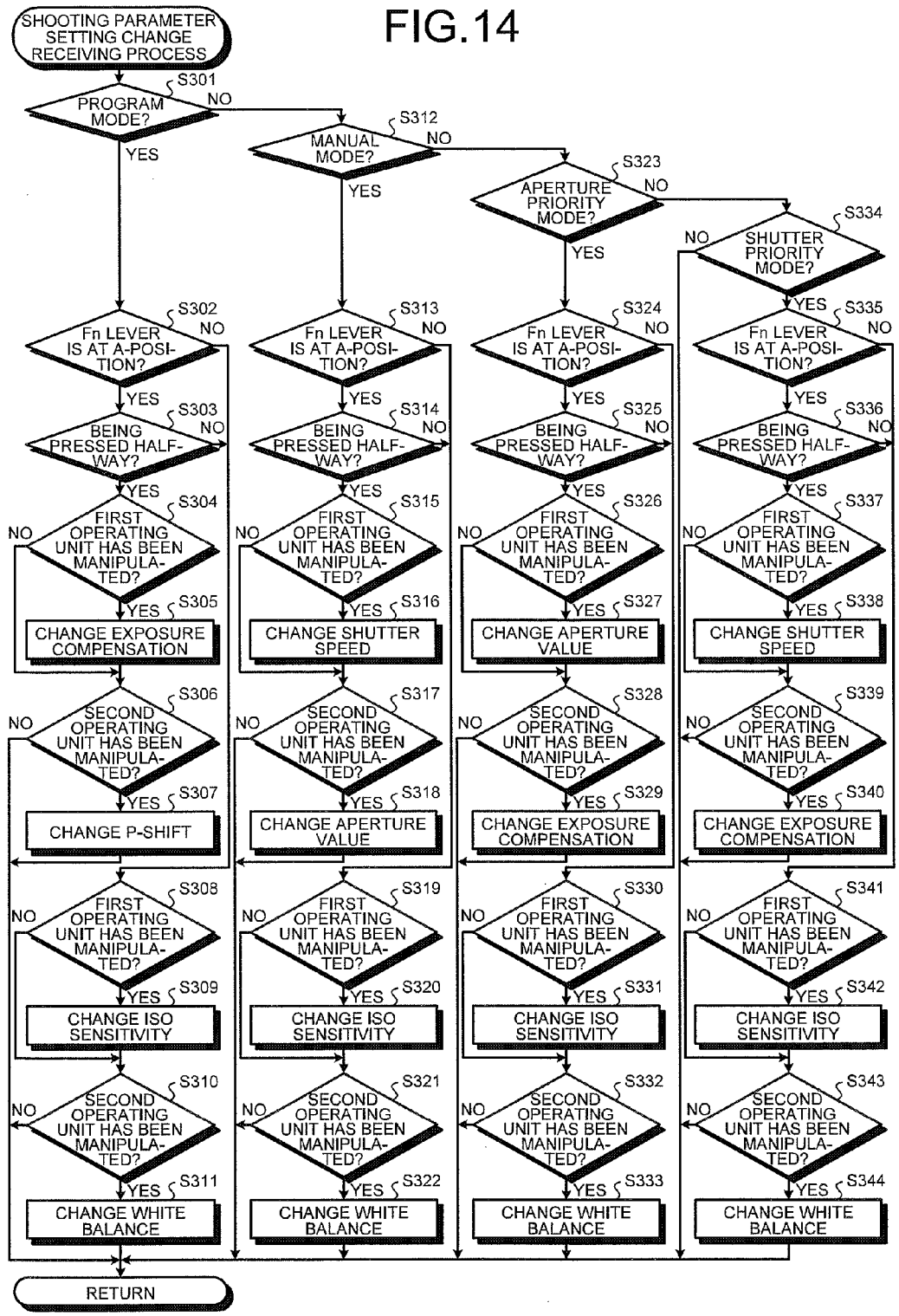
FIG. 14 is a flow chart illustrating an outline of a shooting parameter setting change receiving process executed by the imaging apparatus according to the second embodiment of the present invention.

The shooting parameter setting change receiving process executed by the imaging apparatus 10 having the above configuration will be described. FIG. 14 is a flow chart illustrating an outline of the shooting parameter setting change receiving process executed by the imaging apparatus 10.

As illustrated in FIG. 14, first, a case in which the shooting mode of the imaging apparatus 10 has been set to program mode (step S301: Yes) will be described. In this case, when the Fn lever R1 of the Fn lever change-over switch 211e is at the A-position (step S302: Yes), the release switch 2112 is being pressed halfway (step S303: Yes), and the first operating unit 211b is operated (step S304: Yes), the parameter control unit 227a changes the exposure compensation according to the user's manipulation on the first operating unit 211b (step S305). In this case, the parameter control unit 227a switches over the shooting function of the first operating unit 211b to the exposure compensation as the shooting function of the second mode, even if the shooting function of the first operating unit 211b is of the first mode.

Figure 15:
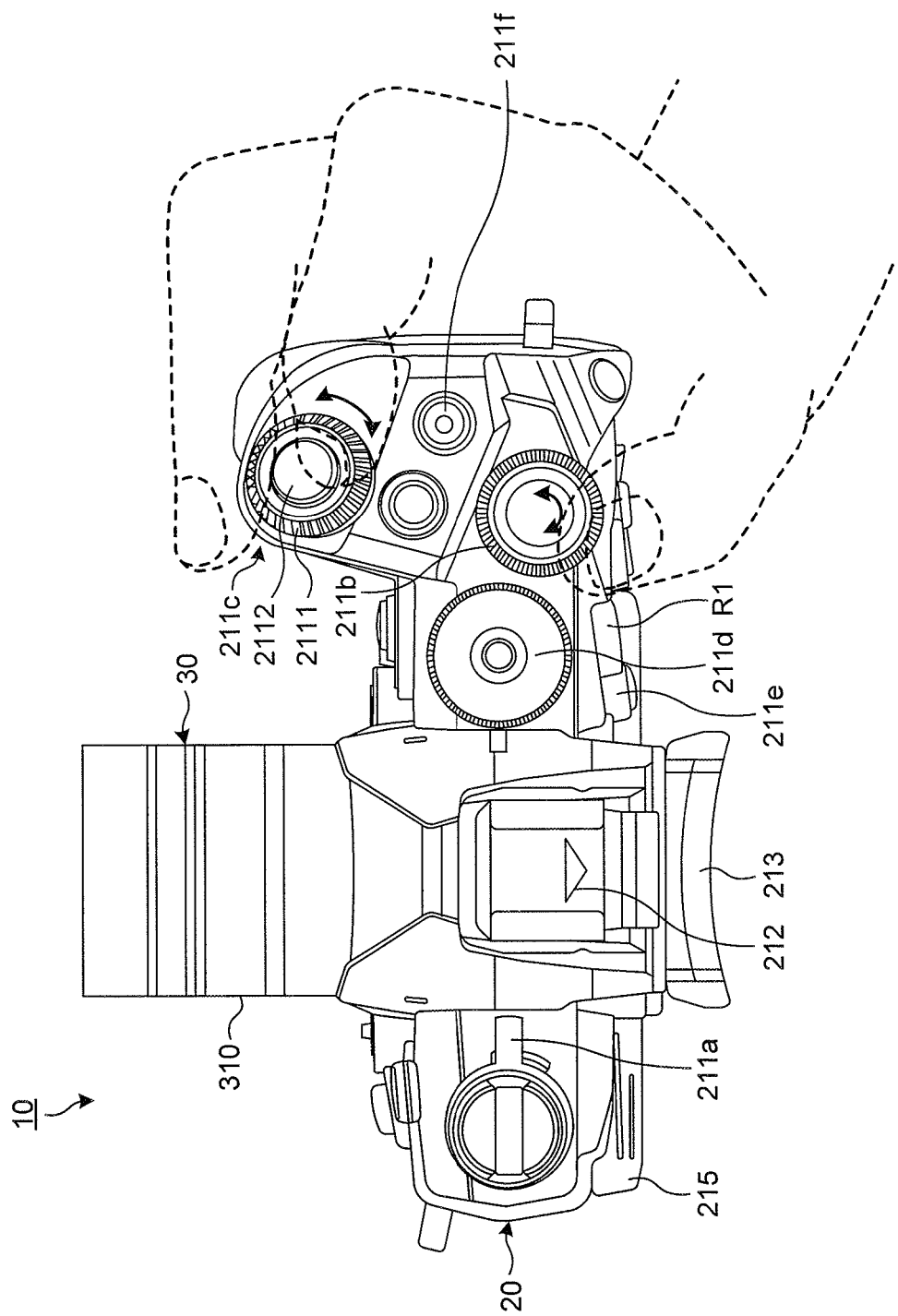
FIG. 15 is a diagram schematically illustrating a situation of manipulating a first operating unit in a state in which a release switch of the imaging apparatus according to the second embodiment of the present invention has been pressed halfway.

FIG. 15 is a diagram schematically illustrating a situation in which the user manipulates the first operating unit 211b in a state in which the release switch 2112 has been pressed halfway by the user.

As illustrated in FIG. 15, even in a state in which the user has pressed the release switch 2112 halfway with the index finger of the right hand while supporting the imaging apparatus 10 with the left hand (not illustrated) and the focus and exposure with respect to the subject have been determined (for example, see the live view image $LV_1$ of FIG. 4), the user may predict a finished result of picture forming and may want to make a change to a shooting parameter conforming to a shooting condition of the subject. However, as illustrated in FIG. 15, since the user is pressing the release switch 2112 halfway with the index finger of the right hand, for example, if the shooting condition of the subject changes or if the user determines that desired picture forming is not possible, when a shooting function of a high priority in the finishing of the picture forming has not been allocated to the first operating unit 211b, the user is not able to easily change to a shooting parameter conforming to the change in the shooting condition of the subject or the desired picture forming.

Thus, in this second embodiment, the parameter control unit 227a switches over the shooting function of the first operating unit 211b if the release switch 2112 is pressed halfway. Thereby, as illustrated in FIG. 15, even if the shooting condition of the subject changes or a desired finished result is wanted, in a state (in a fixed state) in which the release switch 2112 has been pressed halfway with the index finger of the right hand and the focus and exposure with respect to the subject have been determined, by manipulating the first operating unit 211b, change to a shooting parameter conforming to the change in the shooting condition or desired finishing is possible. Further, as illustrated in FIG. 15, since the user is taking a shooting posture with the release switch 2112 being pressed halfway with the index finger, the user is able to infallibly shoot the subject reflected with the desired finished result without missing the shutter chance.

Subsequently, step S306 and step S307 correspond to step S204 and step S205 of FIG. 7, respectively. After step S307, the imaging apparatus 10 returns to the main routine of FIG. 3 described in the first embodiment.

At step S304, if the first operating unit 211b is not being manipulated (step S304: No), the imaging apparatus 10 proceeds to step S306.

At step S302, when the Fn lever R1 of the Fn lever change-over switch 211e is at the A-position (step S302: Yes) and the release switch 2112 is not being pressed halfway (step S303: No), the imaging apparatus 10 proceeds to later described step S308.

At step S302, if the Fn lever R1 of the Fn lever change-over switch 211e is not at the A-position (step S302: No), the imaging apparatus 10 proceeds to later described step S308.

Step S308 to step S311 correspond to step S206 to step S209 of FIG. 7, respectively. After step S311, the imaging apparatus 10 returns to the main routine of FIG. 3 described in the first embodiment.

At step S301, if the shooting mode of the imaging apparatus 10 has not been set to program mode (step S301: No) and the shooting mode of the imaging apparatus 10 is set to manual mode (step S312: Yes), the imaging apparatus 10 proceeds to step S313.

Subsequently, if the Fn lever R1 of the Fn lever change-over switch 211e is at the A-position (step S313: Yes), the release switch 2112 is being pressed halfway (step S314: Yes), and the first operating unit 211b is manipulated (step S315: Yes), the parameter control unit 227a changes the shutter speed of the shooting parameter set to the imaging apparatus 10, according to the manipulation on the first operating unit 211b (step S316). Thereby, shooting at the shutter speed conforming to the shooting condition and state of the subject, for example, the moving velocity and brightness, is possible. After step S316, the imaging apparatus 10 proceeds to step S317.

Subsequently, if the second operating unit 2111 is manipulated (step S317: Yes), the parameter control unit 227a changes the aperture value of the shooting parameter set to the imaging apparatus 10 (step S318). Thereby, shooting provided with contrast to the subject and background is possible. After step S318, the imaging apparatus 10 returns to the main routine of FIG. 3 described in the first embodiment.

At step S315, if the first operating unit 211b has not been manipulated (step S315: No), the imaging apparatus 10 proceeds to step S317.

At step S317, if the second operating unit 2111 has not been operated (step S317: No), the imaging apparatus 10 returns to the main routine of FIG. 3 described in the first embodiment.

At step S313, if the Fn lever R1 of the Fn lever change-over switch 211e is not at the A-position (step S313: No), the imaging apparatus 10 proceeds to step S319.

Step S319 to step S322 correspond to step S206 to step S209 of FIG. 7, respectively. After step S322, the imaging apparatus 10 returns to the main routine of FIG. 3 described in the first embodiment.

At step S301, if the shooting mode of the imaging apparatus 10 has not been set to program mode (step S301: No) and the shooting mode of the imaging apparatus 10 has not been set to manual mode (step S312: No), the imaging apparatus 10 proceeds to step S323.

Subsequently, if the shooting mode of the imaging apparatus 10 has been set to aperture priority mode (step S323: Yes), the imaging apparatus 10 proceeds to step S324.

Thereafter, if the Fn lever R1 of the Fn lever change-over switch 211e is at the A-position (step S324: Yes), the release switch 2112 is being pressed halfway (step S325: Yes), and the first operating unit 211b is manipulated (step S326: Yes), the parameter control unit 227a changes, according to the manipulation on the first operating unit 211b, the aperture value of the shooting parameter set to the imaging apparatus 10 (step S327). Thereby, shooting with an aperture value conforming to the state of the subject, for example, the expression and brightness thereof, is possible. After step S327, the imaging apparatus 10 proceeds to step S328.

Subsequently, if the second operating unit 2111 has been manipulated (step S328: Yes), the parameter control unit 227a changes the exposure value of the shooting parameter set to the imaging apparatus 10 (step S329). Thereby, shooting with an exposure value conforming to the brightness of the subject is possible. After step S329, the imaging apparatus 10 returns to the main routine of FIG. 3 described in the first embodiment.

At step S326, if the first operating unit 211b has not been manipulated (step S326: No), the imaging apparatus 10 proceeds to step S328.

At step S328, if the second operating unit 2111 has not been manipulated (step S328: No), the imaging apparatus 10 returns to the main routine of FIG. 3 described in the first embodiment.

At step S324, if the Fn lever R1 of the Fn lever change-over switch 211e is not at the A-position (step S324: No), the imaging apparatus 10 proceeds to step S330.

Step S330 to step S333 correspond to step S206 to step S209 of FIG. 7, respectively. After step S333, the imaging apparatus 10 returns to the main routine of FIG. 3 described in the first embodiment.

At step S323, if the shooting mode of the imaging apparatus 10 has not been set to aperture priority mode (step S323: No), the imaging apparatus 10 proceeds to step S334.

Subsequently, if the shooting mode of the imaging apparatus 10 has been set to shutter priority mode (step S334: Yes), the imaging apparatus 10 proceeds to step S335.

Thereafter, if the Fn Lever R1 of the Fn lever change-over switch 211e is at the A-position (step S335: Yes), the release switch 2112 is being pressed halfway (step S336: Yes), and the first operating unit 211b is manipulated (Step S337: Yes), the parameter control unit 227a changes, according to the manipulation on the first operating unit 211b, the shutter speed of the shooting parameter set to the imaging apparatus 20 (step S338). Thereby, shooting by instantly switching over to a shutter speed conforming to the shooting condition of the subject is possible. After step S338, the imaging apparatus 10 proceeds to step S339.

Subsequently, if the second operating unit 2111 has been manipulated (step S339: Yes), the parameter control unit 227a changes the exposure value of the shooting parameter set to the imaging apparatus 10 (step S340). Thereby, shooting with an exposure value conforming to the brightness of the subject is possible. After step S340, the imaging apparatus 10 returns to the main routine of FIG. 3 described in the first embodiment.

At step S337, if the first operating unit 211b has not been operated (Step S337: No), the imaging apparatus 10 proceeds to step S339.

At step S339, if the second operating unit 2111 has not been operated (step S339: No), the imaging apparatus 10 returns to the main routine of FIG. 3 described in the first embodiment.

At step S335, if the Fn lever R1 of the Fn lever changeover switch 211e is not at the A-position (step S335: No), the imaging apparatus 10 proceeds to step S341.

Step S341 to step S344 correspond to step S206 to step S209 of FIG. 7, respectively. After step S344, the imaging apparatus 10 returns to the main routine of FIG. 3 described in the first embodiment.

At step S334, if the shooting mode of the imaging apparatus 10 has not been set to shutter priority mode (step S334: No), the imaging apparatus 10 returns to the main routine of FIG. 3 described in the first embodiment.

According to the above described second embodiment of the present invention, if the 1st is input from the release switch 2112, the parameter control unit 227a switches over the shooting function allocated to the first operating unit 211b to another shooting function. Thereby, picture forming conforming to the change in the shooting condition of the subject upon shooting is possible.

Further, according to the second embodiment of the present invention, since the release switch 2112 is provided on the axis P1 of the second operating unit 2111, the shooting parameter most reflected in the finished result of the picture forming is able to be changed easily by using the first operating unit 211b while pressing the release switch 2112 halfway.

Further, according to the second embodiment of the present invention, the parameter control unit 227a allocates different shooting functions to the first operating unit 211b and second operating unit 2111 respectively, and switches over the shooting function according to the 1st from the release switch 2112. As a result, without increasing the number of operating members, the number of the operating units are virtually increased, and thus downsizing while maintaining the operability is possible.

In this second embodiment of the present invention, although the parameter control unit 227a switches over the allocation of the shooting functions of the first operating unit 211b and second operating unit 2111 according to the position of the Fn lever R1 of the Fn lever change-over switch 211e, the parameter control unit 227a may switch over the allocation of the shooting functions of the first operating unit 211b and second operating unit 2111 according to the number of switch-overs of the Fn lever R1 of the Fn lever change-over switch 211e. Specifically, the parameter control unit 227a may switch over the shooting function of the first operating unit 211b in the order of exposure compensation, shutter speed, aperture, chroma, tone curve, contrast, focal position, AF method, white balance, and ISO, according to the number of switch-overs between the A-position and B-position of the Fn lever R1 of the Fn lever change-over switch 211e. In this case, when the release switch 2112 is pressed halfway, the shooting function having a high priority in the picture forming, for example, the shooting function of exposure compensation, may be allocated to the first operating unit 211b.

Modified Example of Second Embodiment

Next, a modified example of the second embodiment of the present invention will be described. In the above described second embodiment, although the shooting functions of the first operating unit 211b and second operating unit 2111 are switched over according to the state of the release switch 2112, the shooting function of the mode change-over switch 211d may be switched over according to the state of the release switch 2112.

Figure 16:
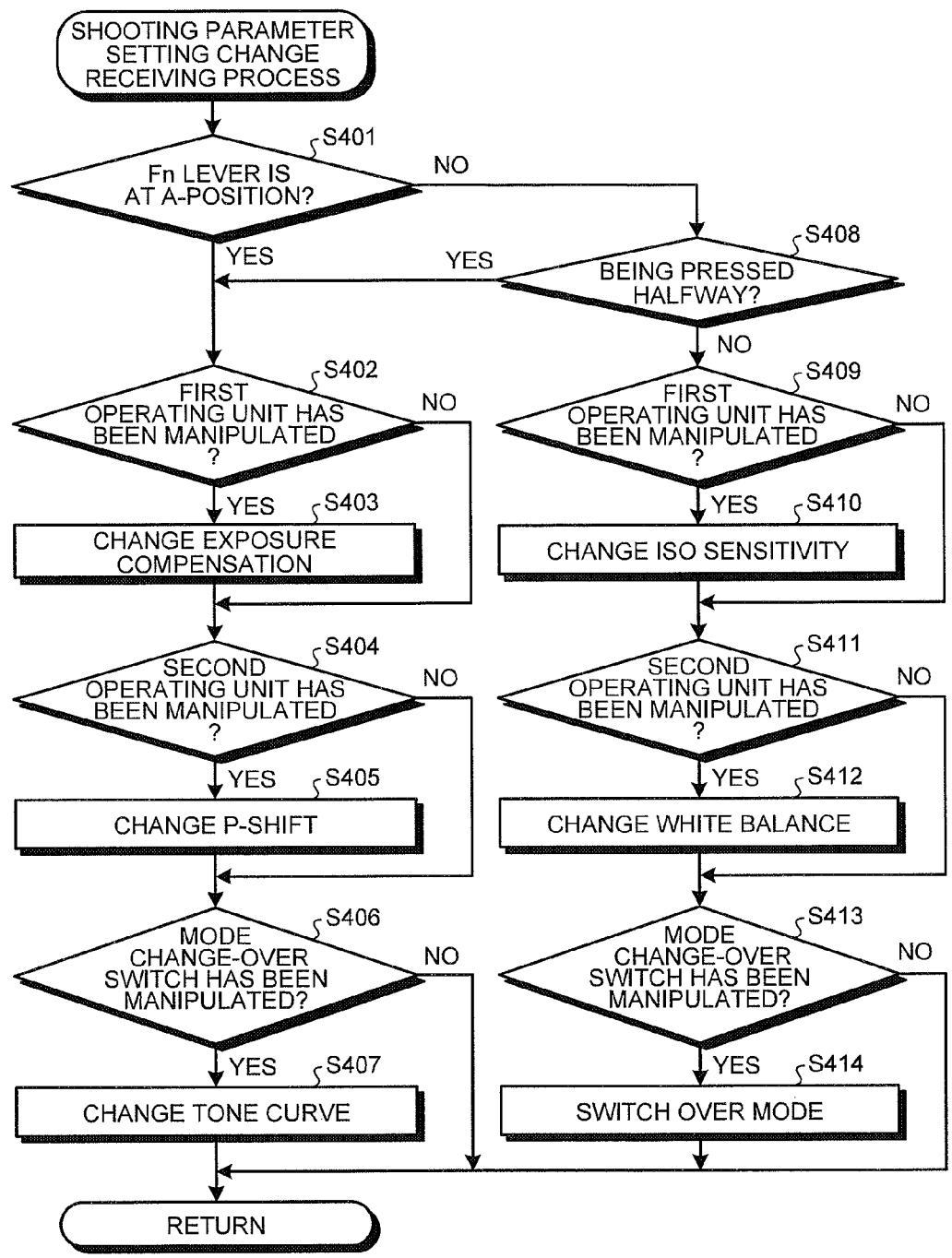
FIG. 16 is a flow chart illustrating an outline of a shooting parameter setting change receiving process executed by an imaging apparatus according to a modified example of the second embodiment of the present invention.

FIG. 16 is a flow chart illustrating an outline of a shooting parameter setting change receiving process executed by the imaging apparatus 10 according to the modified example of this second embodiment.

As illustrated in FIG. 16, first, if the Fn lever R1 of the Fn lever change-over switch 211e is at the A-position (step S401: Yes), the imaging apparatus 10 proceeds to step S402.

Step S402 to step S405 correspond to step S202 to step S205 of FIG. 7, respectively. After step S405, the imaging apparatus 10 proceeds to step S406.

Subsequently, if the mode change-over switch 211d has been manipulated (step S406: Yes), the parameter control unit 227a changes, according to the manipulation on the mode change-over switch 211d, the tone curve of the shooting parameter set to the imaging apparatus 10 (step S407). After step S407, the imaging apparatus 10 returns to the main routine of FIG. 3 described in the first embodiment.

At step S406, if the mode change-over switch 211d has not been manipulated (step S406: No), the imaging apparatus 10 returns to the main routine of FIG. 3 described in the first embodiment.

At step S401, if the Fn lever R1 of the Fn lever change-over switch 211e is not at the A-position (step S401: No), the imaging apparatus 10 proceeds to step S408.

At step S408, if the release switch 2112 is being pressed halfway (step S408: Yes), the imaging apparatus 10 proceeds to step S402. In contrast, if the release switch 2112 is not being pressed halfway (step S408: No), the imaging apparatus 10 proceeds to step S409.

Step S409 to step S412 correspond to step S206 to step S209 of FIG. 7, respectively. After step S412, the imaging apparatus 10 proceeds to step S413.

Subsequently, if the mode change-over switch 211d has been manipulated (step S413: Yes), the parameter control unit 227a switches over the shooting mode of the imaging apparatus 10, according to the manipulation on the mode change-over switch 211d (step S414). After step S414, the imaging apparatus 10 returns to the main routine of FIG. 3 described in the first embodiment.

At step S413, if the mode change-over switch 211d has not been manipulated (step S413: No), the imaging apparatus 10 returns to the main routine of FIG. 3 described in the first embodiment.

According to the modified example of the second embodiment of the present invention, if the 1st is input from the release switch 2112, the parameter control unit 227a switches over the shooting functions allocated to the first operating unit 211b and mode change-over switch 211d to the shooting functions for changing the shooting parameters that are able to conform to the change in the shooting condition of the subject. Thereby, picture forming conforming to the change in the shooting condition of the subject upon shooting is possible, and since the number of operating units are virtually increased without increasing the number of operating members, downsizing while maintaining the operability is possible.

Other Embodiments

Figure 17:
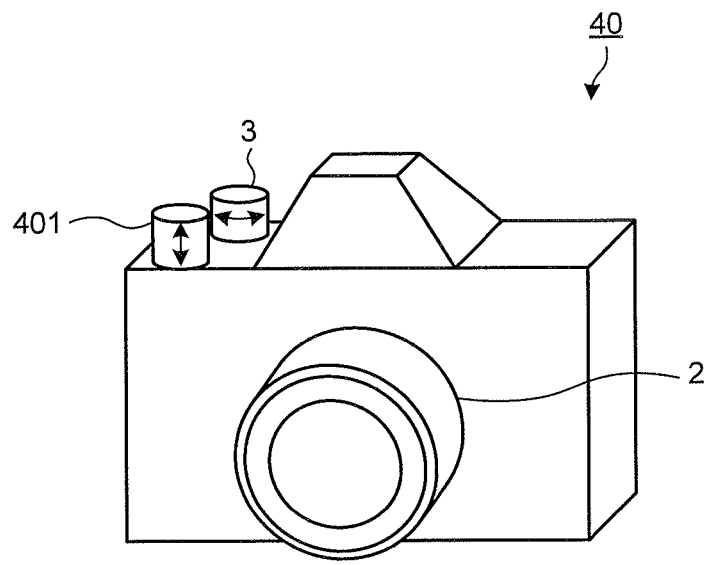
FIG. 17 is a perspective diagram illustrating a configuration of a subject facing side of an imaging apparatus according to a first modified example of another embodiment of the present invention.

The imaging apparatus according to the above-mentioned embodiments includes the plurality of operating units, but for example, a shooting function allocated to a single operating unit may be switched over according to the state of the release switch. For example, as illustrated in FIG. 17, in an imaging apparatus 40, a release switch 401 and the first operating unit 3 may be provided, and if the release switch 401 is pressed halfway, the parameter control unit 9a may switch over the shooting function of the first operating unit 3 from the white balance to the exposure compensation.

Figure 18:
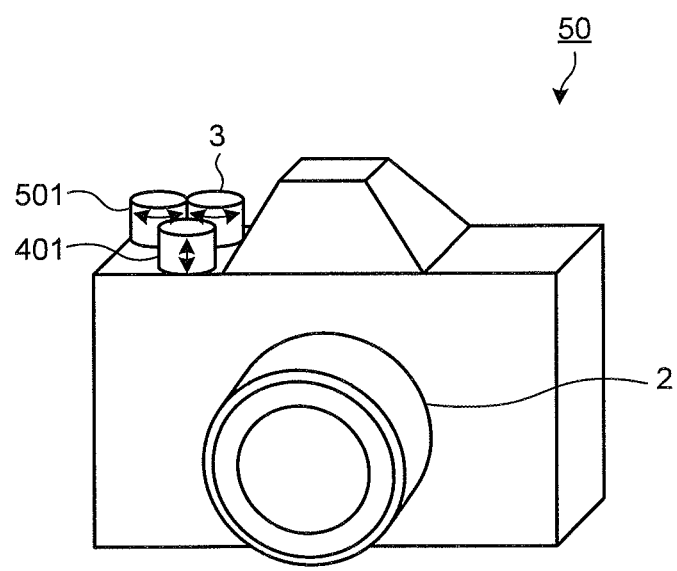
FIG. 18 is a perspective diagram illustrating a configuration of a subject facing side of an imaging apparatus according to a second modified example of the another embodiment of the present invention.

In the imaging apparatus according to the above-mentioned embodiments, although the second operating unit and the release switch were integrally provided, for example, the second operating unit may be provided in parallel with the first operating unit. For example, as illustrated in FIG. 18, in an imaging apparatus 50, a release switch 401 may be provided on a subject side thereof, and a second operating unit 501 may be provided in parallel with the first operating unit 3.

Figure 19:
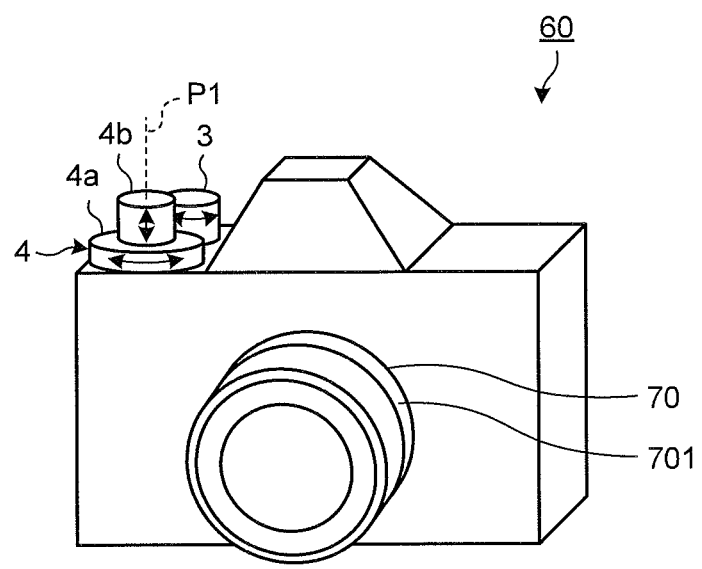
FIG. 19 is a perspective diagram illustrating a configuration of a subject facing side of an imaging apparatus according to a third modified example of the another embodiment of the present invention.

An imaging apparatus according to some embodiments may be applied to an operating ring provided on a lens barrel. For example, as illustrated in FIG. 19, in an imaging apparatus 60, an operating ring 701 may be provided on a lens barrel 70, and if the release switch 4b is pressed halfway, the parameter control unit 9a may switch over the shooting function that has been allocated to the operating ring 701, for example, from the aperture to the exposure compensation.

In an imaging apparatus according to some embodiments, a parameter control unit may switch over the shooting functions of the first operating unit and second operating unit, if an instruction signal to shoot a moving image is input from a moving image switch.

Although for the imaging apparatus according to the above-mentioned embodiments, the release switch is pressed with the index finger, not being limited thereto, this may be done with the thumb or middle finger.

In an imaging apparatus according to some embodiments, a parameter control unit may switch over shooting functions of a first operating unit and a second operating unit, if the 1st is input, via an accessory communication unit of the imaging apparatus, from a freely detachable release switch or wireless release switch.

An imaging apparatus according to some embodiments may be applied to a microscope apparatus, a medical apparatus, or a medical system. Specifically, if the imaging apparatus is applied to an endoscope apparatus, when an operator (doctor) performs shooting with an endoscope and there is an operation on an operating unit that receives an input of an instruction signal for adjusting a focal position, the operating unit having a preset function of receiving an input of an instruction signal for changing the mode of the endoscope, for example, the normal observation mode, to the NBI mode, for example, may be switched to a function, such as enlargement of the image or driving of an electric knife. Of course, for a microscope apparatus, if an operating unit that receives an input of an instruction signal instructing movement of a stage has been manipulated, a function of another operating member may be switched over to another function, for example, to a function for changing a turret having an objective lens or the types of an illumination system.

An imaging apparatus according to some embodiments may be applied to, in addition to digital single-lens reflex cameras: digital cameras; digital video cameras; and electronic devices, such as mobile phones and tablet mobile devices, which have imaging functions.

A program to be executed by an imaging apparatus according to some embodiments is provided as file data of an installable format or executable format, by being recorded in a computer readable recording medium, such as a CD-ROM, a flexible disk (FD), a CD-R, a digital versatile disk (DVD), a USB medium, a flash memory, or the like.

A program to be executed by the imaging apparatus according to some embodiments may be configured to be stored on a computer connected to a network such as the Internet and provided by causing it to be downloaded via the network. Further, a program to be executed by the imaging apparatus according to the present invention may be configured to be provided or distributed via a network such as the Internet.

In describing the flow charts in this specification, context of the processes among the steps is disclosed by using expressions such as "first", "thereafter", and "subsequently", but the sequences of the processes necessary for carrying out the present invention are not uniquely defined by these expressions. That is, the sequences of the processes in the flow charts described in the present specification may be modified as long as there is no contradiction.

According to some embodiments, it is possible to conform to a change in a shooting condition of a subject while an index finger is being placed on a release switch.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging apparatus having a plurality of shooting functions, the imaging apparatus comprising:
an imaging unit configured to capture an image of a subject to generate image data of the subject;
two operating units each configured to receive an input of a change signal for instructing a change in shooting parameter of a preset shooting function;
a release switch configured to be projected and depressed by an external pressing force, configured to receive an input of a shooting preparation signal for instructing a shooting preparation operation when pressed halfway, and configured to receive an input of a shooting signal for instructing shooting when fully pressed;
a setting unit configured to set at least one or more shooting functions among the plurality of shooting functions, to each of the two operating units such that different shooting functions are allocated to each of the two operating units; and
a control unit configured to switch over the at least one or more shooting functions of each of the two operating units set by the setting unit, to a limited shooting function capable of conforming to a change in a shooting condition of the subject, when the release switch is being kept pressed halfway even after the release switch is pressed halfway to fix at least one of a focal position and photometric value with respect to the subject.

2. The imaging apparatus according to claim 1, wherein the two operating units include two rotary members configured to rotate about different axes,
the setting unit is configured to set different shooting functions to each of the two rotary members,
the release switch is provided on an axis of one of the two rotary members, and
when the shooting preparation signal is input from the release switch, the control unit is configured to switch over a shooting function of the plurality of shooting functions that is allocated to at least the other of the two rotary members, to one of exposure compensation and aperture.

3. The imaging apparatus according to claim 2, further comprising a display unit for displaying the image corresponding to the image data, wherein the two rotary members are respectively provided on a front side and rear side of the imaging apparatus, when the shooting preparation signal is input from the release switch, and a shooting function of the plurality of shooting functions that is set to at least one of the two operating units is switched over, the control unit is configured to cause the display unit to display information in which the different shooting functions and a positional relation between the two rotary members are associated with each other, such that the information is superimposed on the image.

4. The imaging apparatus according to claim 3, further comprising a change-over setting unit configured to switch between first and second modes, the first mode being for setting the different shooting functions to each of the two rotary members, the second mode being for setting one of exposure compensation and aperture that is a different shooting function from the first mode and has at least a higher priority than that of the first mode, wherein if the change-over setting unit sets the first mode and when the shooting preparation signal is input from the release switch, the control unit is configured to switch from the first mode to the second mode.

5. An imaging method executed by an imaging apparatus having a plurality of shooting functions, the imaging apparatus comprising: an imaging unit configured to capture an image of a subject to generate image data of the subject; two operating units each configured to receive an input of a change signal for instructing a change in shooting parameter of a preset shooting function; and a release switch configured to be projected and depressed by an external pressing force, configured to receive an input of a shooting preparation signal for instructing a shooting preparation operation when pressed halfway, and configured to receive an input of a shooting signal for instructing shooting when fully pressed, the imaging method comprising:

a setting step of setting at least one or more shooting functions among the plurality of shooting functions, to each of the two operating units such that different shooting functions are allocated to each of the two operating units; and a control step of switching over the at least one or more shooting functions of each of the two operating units set at the setting step, to a limited shooting function capable of conforming to a change in a shooting condition of the subject, when the release switch is being kept pressed halfway even after the release switch is pressed halfway to fix at least one of a focal position and photometric value with respect to the subject.

6. A non-transitory computer-readable recording medium with an executable program stored thereon, the program instructing an imaging apparatus that has a plurality of shooting functions and comprises: an imaging unit configured to capture an image of a subject to generate image data of the subject; two operating units each configured to receive an input of a change signal for instructing a change in shooting parameter of a preset shooting function; and a release switch configured to be projected and depressed by an external pressing force, configured to receive an input of a shooting preparation signal for instructing a shooting preparation operation when pressed halfway, and configured to receive an input of a shooting signal for instructing shooting when fully pressed, to perform:

a setting step of setting at least one or more shooting functions among the plurality of shooting functions, to each of the two operating units such that different shooting functions are allocated to each of the two operating units; and a control step of switching over the at least one or more shooting functions of each of the two operating units set at the setting step, to a limited shooting function capable of conforming to a change in a shooting condition of the subject, when the release switch is being kept pressed halfway even after the release switch is pressed halfway to fix at least one of a focal position and photometric value with respect to the subject.

* * * * *